United States Patent
Bao et al.

(10) Patent No.: US 6,996,374 B1
(45) Date of Patent: Feb. 7, 2006

(54) SECTOR CAPACITY PREDICTION

(75) Inventors: Derek Hongwei Bao, Concord, CA (US); Scott Anthony Townley, Gilbert, AZ (US)

(73) Assignee: Cellco Partnership, Bedminster, NJ (US)

(*) Notice: Subject to any disclaimer, the term of this patent is extended or adjusted under 35 U.S.C. 154(b) by 521 days.

(21) Appl. No.: 10/207,223

(22) Filed: Jul. 30, 2002

(51) Int. Cl.
*H04B 17/00* (2006.01)

(52) U.S. Cl. .................. 455/67.11; 455/446; 455/449; 455/67.13; 455/423; 455/424; 455/425; 455/453; 455/561

(58) Field of Classification Search ............ 455/67.11, 455/446, 449, 67.13, 423, 424, 425, 453, 455/561
See application file for complete search history.

(56) References Cited

U.S. PATENT DOCUMENTS

| | | | | |
|---|---|---|---|---|
| 5,475,861 A | * | 12/1995 | Hall | 455/453 |
| 5,987,055 A | * | 11/1999 | Duque-Anton et al. | 375/130 |
| 6,006,095 A | * | 12/1999 | Bernardin et al. | 455/446 |
| 6,052,583 A | * | 4/2000 | Bernardin | 455/423 |
| 6,097,956 A | | 8/2000 | Veeravalli et al. | |
| 6,173,175 B1 | | 1/2001 | Alazma et al. | |
| 6,173,185 B1 | * | 1/2001 | Bernardin et al. | 455/446 |
| 6,266,531 B1 | * | 7/2001 | Zadeh et al. | 455/453 |
| 6,397,066 B1 | | 5/2002 | Servi | |
| 6,438,375 B1 | * | 8/2002 | Muller | 455/435.3 |
| 6,651,012 B1 | * | 11/2003 | Bechhoefer | 702/34 |
| 2003/0003918 A1 | * | 1/2003 | Proctor et al. | 455/446 |

\* cited by examiner

*Primary Examiner*—Sonny Trinh
*Assistant Examiner*—Huy Phan
(74) *Attorney, Agent, or Firm*—McDermott Will & Emery LLP

(57) ABSTRACT

Infrastructure network service measurements are used to determine sector capacity, or the like, in a wireless network. The embodiments use a linear regression to predict current usage and/or capacity of the radio-frequency link resources between wireless subscribers and wireless base stations, for example, as an indication of when the link is incapable of supporting additional subscribers. The determination of resource capacity can be refined down to the sector-carrier level (a single carrier within a base station sector). The prediction can be cast in terms of time, which allows network service providers to plan the growth of their base stations to meet subscriber needs. Metrics derived from the regression, such as line slope, also provide useful information about usage and performance.

52 Claims, 8 Drawing Sheets

SECTOR CAPACITY PREDICTION

FIELD OF ENDEAVOR

The present subject matter relates to techniques and equipment to determine sector capacity, in a wireless communication network, using network service measurements, in many cases, as taken by the network infrastructure.

BACKGROUND

In recent years, cellular telephones have emerged as a must-have appliance among mobile professionals and consumers alike, growing in popularity every year since they were first introduced. Their widespread use for both voice and data communications has resulted from significant progress made in their portability, network services availability, and the miniaturization and declining cost of chips, memory, and other components. The public has come to accept that mobile service enhances business and personal communications and may contribute to personal security. Consequently, mobile communication is becoming increasingly popular, particularly for voice-grade telephone services, and more recently for data communication services.

As a result of the popularity of the mobile services, there is an increasing load on the network infrastructure, which places an increased burden on the network operators to manage their wireless networks and deploy more equipment and/or higher capacity equipment in a reasoned manner that anticipates demand. For these and other reasons, there is a need to monitor usage and estimate capacity, for various network resources. To understand the problem in the appropriate context, it may be helpful to briefly consider the structure and operation of a modem wireless communications network, and thus the resources that must be developed, deployed and managed.

The construction of a wireless communication system typically includes a number of base stations dispersed throughout the service region. The geographic service region may be thought of as made up of a number of individual radio coverage areas, which typically are called "cells." Within each cell, a base station provides two-way radio communications through its RF front end, essentially for its assigned coverage cell. The users' mobile stations communicate over-the-air, via a standard air-link interface protocol, with one or more of the base stations. To increase capacity, the cell covered by each base station may be divided into a number of sectors, by using directional antennas. In the most common configuration, a cell is divided into three sectors, each of which covers a different 120-degree section of the cell.

Groups of base stations connect to base station controllers, and each base station controller connects to a mobile switching center. In some networks, the base stations connect directly to the mobile switching center. In either case, the mobile switching center in turn provides switching between the base stations, for example for communications between mobile subscriber stations, as well as switching of communications to and from the public switched telephone network and other mobile switching centers. In more advanced networks, one or more nodes of the network also provide a packet switched coupling to a wide area data network, for Internet access and/or for private Intranet services.

Any such wireless communication system utilizes allocated frequency resources. In a direct sequence spread spectrum type system, a relatively wide frequency band (e.g. 1.23 MHz wide) is shared by a large number of base and mobile stations. Systems in high-traffic areas may utilize two or more such allocated frequency bands. For services on a given band, spreading of digital streams with different codes differentiates logical channels on the network, and thus allows the stations to differentiate the various communications transported over the shared wide frequency band. The logical channels, and thus the spreading codes used to define the channels, are network resources, which become scarce as traffic increases. The frequency band(s) or carrier(s) also are limited resources. The capacity of any base station or sector is a function of the available resources and the amount of concurrent usage that those resources can support under the unique conditions applicable in the particular cell or sector. As existing resource capacity is consumed by increased usage, remaining capacity becomes increasingly scarce, and at some point, the carrier must determine how to modify or upgrade the network to provide resources for further increases in usage, particularly in high traffic areas.

An IS-95 type cellular communications system (i.e., a communications system implemented according to Telecommunications Industry Association (TIA) Interim Standard (IS) 95, or the like), for example, uses three different pseudonoise (PN) sequences: long PN codes, Walsh codes, and short PN codes. For a downlink transmission of a digital stream, e.g. a digitized voice signal, the base station scrambles the digital stream with a long PN sequence. After some further processing, e.g. puncturing and interleaving, the base station uses an assigned one of the Walsh codes for orthogonal spreading of the digital stream. The Walsh code effectively defines a traffic channel assigned to the mobile station for purposes of the current call or session.

The base station transceiver further spreads the stream with the short PN sequence, which results in a QPSK output. The short PN code is a 15-bit sequence. The same sequence is used in many cells, however, the transceiver for each sector uses a different time offset for the short PN sequence, to differentiate each sector. The short PN offsets are typically reused throughout a CDMA cellular system in the same manner as frequencies are reused throughout an analog cellular system. The PN offsets are assigned to a cluster of cells. This group of PN offsets is then reused multiple times within the cellular system. Each PN offset is not used by other nearby radiotelephones within a cluster as this would lead to interference on the channel and a reduction in signal quality. The QPSK output is upconverted to the appropriate frequency band and transmitted from the sector antenna on the appropriate carriers to mobile stations within the cellsector. Essentially, a mobile station recognizes traffic directed to it based on a combination of the PN sequence offset (unique to the base station sector) and the Walsh code (assigned for transmission by the base station to the mobile station for the particular session or call).

The maximum theoretical traffic capacities of such a wireless system and of the sectors in the cells of such a system therefore are determined by the number of carriers (bands) and the number of orthogonal Walsh (identifier) codes, which are available in each sector of the system. In the present CDMA system, the maximum number of the Walsh codes is 64. Although some systems may use all of the Walsh codes for traffic channels, in most systems, up to nine of these codes are used for pilot, sync and paging functions, which leaves approximately 55 Walsh codes for traffic channels. In a typical sectorized network, each sector of a cell will have its own pilot channel, defined by its short PN offset and one of the Walsh codes (typically W0). The reduced number of orthogonal codes at least theoretically indicates how much load or traffic can be carried, i.e., the capacity of each cell sector.

In practice, however, the number of traffic channels (and therefore the number of remote terminals) that can be simultaneously supported by a given band used in any one sector is more limited. Despite the mathematical orthogonality between channels that are assigned different Walsh code sequences, interference within a given frequency band will still occur between those channels. This interference increases as more code channels are assigned until the level of interference adversely affects the integrity of the communications. Depending upon the circumstances, this interference can substantially limit the number of remote stations that can be serviced at one time by a single base station sector-carrier.

When a mobile station receives downstream communications from a single base station, the traffic to that station utilizes a single Walsh code. However, as a mobile station moves, the station transits from one sector to an adjacent sector and from one cell to another. The wireless network hands off the mobile station's communications as it crosses each boundary. During a "soft" handoff transition, the mobile station receives signals from two or more sectors and/or two or more base stations and combines the signals to produce the data stream for processing and output to the user. Consequently, the downstream traffic to the one mobile station requires a number of channels and associated Walsh code resources from the serving sectors or base stations. The mobile station releases duplicate resources only when the handoff is complete. As noted, there are a relatively limited number of orthogonal channels defined by the Walsh codes available in the communication system. To allow for the extra usage of code channels during handoff, it is necessary to reserve some resources, which further decreases effective capacity of each cell and sector.

In some instances, the number of spreading codes available is insufficient to handle the number of mobile stations requiring a traffic channel from a base station. If there is no code available at the start of a call, the call is blocked. If a code is not available during a handoff, the target cell can not take the handoff, and the network may drop the call. A base station that runs low of its scarce channel resources, or runs out of spreading codes for a given carrier of a sector, may be said to be "resource limited" because the number of available spreading codes has dropped below a predetermined threshold.

Hence, a major issue in the design of a wireless communication system is the efficient use of system capacity. Management of an existing network, particularly to timely anticipate increases in demand, requires an understanding of the network's capacity and the extent to which there are resources available to support increased usage.

Today, network service providers use one of two known methods to assess base station capacity. The most widespread method is to assign a fixed maximum value of usage to all sector-carriers in a network, based on theoretical calculations. Planning can then be based on the extent to which actual and/or expected usage approaches the theoretical capacity of particular cells. It is well known in the industry that in actual fact, each individual sector in a system has a different maximum capacity, depending on height above average terrain, clutter environment, geographic distribution of users, etc. Hence, this simplistic approach does not provide an accurate estimate of capacity, in many real-world situations.

The second method is to estimate the Erlang capacity of each sector carrier by estimating the number of actual users of the sector. The method entails: (1) obtaining operational measurement of transmitted power and peak number of users (note that the quantity "peak number of users" is obtainable from some infrastructure manufacturers); (2) finding the quotient to find "average power per user"; (3) finding the maximum number of users permittable, by dividing the maximum available transmit power by the average power per user; (4) converting the maximum number of users to the equivalent maximum Erlangs of traffic using an Erlang table lookup for a specified grade-of-service; and (5) dividing the maximum Erlangs of traffic by the current Erlangs of traffic to estimate "growth factor." This method, while more accurate than the first method, has two significant disadvantages. First, the choice of Erlang queuing model has a significant impact upon the final calculated value of capacity. Second, this method does not directly account for hardware limitations of maximum RF power. The Erlang model has long been a mainstay of traditional telephone company planning. However, the Erlang model is predicated on discrete, equal, limited resources (e.g., lines, or "trunks" in telephony parlance). While transmit (or received) power in the wireless domain is a limited resource, it is not discrete, nor is it equally shared among users, particularly in a code division multiple access-type network. One of the basic principles of CDMA is that users are allocated exactly "enough" power to provide service, but no more, to minimize interference with other coded communications on the band. Therefore, all users use a different amount of power, and they cannot be treated as equal resource demands.

Hence a need exists for a technique to estimate values of capacity for resources of a wireless communication network, which is accurate and based on actual experience. Also, any such technique should avoid the use of Erlang queuing theory. Furthermore, a technique is needed, which directly accounts for the hardware limitations of maximum RF power within the base station equipment, for example, in a digital wireless network. If possible, any technique used to analyze capacity should also provide information about current usage and/or performance.

SUMMARY

The current concepts address one or more of the noted deficiencies in prior art capacity-analysis techniques. For example, a technique is disclosed that calculates unique values of capacity and/or current usage, while avoiding the use of Erlang queuing theory, and it directly accounts for the hardware limitations of maximum RF power within the base station equipment.

Many of the inventive aspects relate to different methods, systems, networks and program products, which enable the capacity-analysis utilizing a linear regression approach. Essentially, a computer system or the like receives resource usage data and resource power level data from the wireless network, with regard to a resource of one of the base stations, such as a particular sector-carrier. The system performs a linear regression on the received resource usage data and resource power level data. One or more metrics, for example, regarding capacity, usage or performance, are derived from the line. Other inventive aspects relate to different methods, systems, networks and program products, which enable an estimation of current resource usage from the usage level data, for example based on analysis of usage during busy hours, for the days of a defined study period.

A method for implementing such an analysis might entail recording level of usage of the air-link resource of the base station by wireless remote stations, and recording a base station power level of communications signals associated with the air-link resource of the base station, over each of several intervals. The processing includes performance of a linear regression on the recorded levels of usage and the recorded power levels. The regression processing calculates a regression line of usage versus power for the particular resource, e.g. for a selected carrier of a sector of a cell.

From the linear regression, it is then possible to determine one or more of a number of useful metrics. One example of such a metric, is an estimate or prediction of a resource capacity. To provide such a metric, the processing involves identifying an operational maximum power parameter associated with the base station. The process then determines maximum usage capacity from a usage level on the regression line, which corresponds in power level to the identified power parameter. Another useful metric is an estimate of current usage. For example, the processing might involve determining current usage from a usage level corresponding to a predetermined percentile of the recorded levels of usage, e.g. the 90th percentile for busy-hour usage of the resource during the study period.

In one embodiment, the network capacity analysis is a process, which evaluates the forward link of a CDMA channel. Hourly data is gathered from each sector-carrier of a wireless base station. This data consists of (1) the peak value of forward RF power developed during each hour, and (2) the total code minutes of use for that same hour (e.g. Walsh code minutes for that hour). These data points are processed through a linear regression routine, with power (in dBm) as the ordinate and usage (in century call seconds, or CCS) on the abscissa. The regression coefficients can be used to determine certain operational characteristics of the sector-carrier in question.

One such operational characteristic is overhead (zero traffic) power. This characteristic is useful data that provides an operational check against design values in the carrier base station database. Also, the maximum power parameter in the capacity projection can be derived as an offset from the overhead power.

Another of the evaluated operational characteristics is the ratio of pilot power to total transmit power at various usage levels. By extrapolation, it is also possible to estimate the usage corresponding to a certain maximum allowable pilot power to total transmit power ratio. It is generally accepted in the wireless industry that CDMA base stations are capacity exhausted when their pilot power to total transmit power ratio falls to between 0.15 and 0.075. Therefore, the capacity analysis process can accurately predict the usage level where the sector-carrier will be exhausted.

In addition, the slope of the regression line ("slope") essentially provides a measure of the radio-frequency efficiency of the sector-carrier. Higher slopes mean that, per unit power, more usage can be carried. This metric is particularly useful in wireless communications. Operationally, this metric allows operators to quickly identify sector-carriers with substandard efficiencies (low slope), and take corrective measures. Additionally, continuous implementation of the capacity analysis process allows operators to evaluate the effectiveness of their corrective measures (slope should measurably increase after changes).

As outlined above, the analysis focused on the forward link (base-to-mobile), however, the concepts are not limited in utility to the forward link. A similar process can be used on the reverse link (mobile-to-base), where the ordinate value can be received power rather than transmitted power.

Various units of measure can be used with the analysis technique with equivalent utility. For usage, one can use CCS, Erlangs, minutes of use, digital bits, or any other conventional usage metric representing communications traffic on a carrier of the particular wireless network measured over an hour or other convenient unit of time (interval). The flexibility in the usage metric allows the process to consider voice or data traffic (e.g., in a 3G1xRTT network), in any combination, without specific treatments.

On the forward link, power in dBm preferably is used. Either peak or average power can be used, though peak is preferred. Use of other power units results in significantly reduced extrapolation accuracy, manifested by larger confidence intervals for a given level of statistical significance. On the reverse link, any standard transform of received power can be used, such as rise above thermal noise or loading percentage (expressed as 1—1/rise above thermal noise).

To improve the accuracy of the regression, the processing may implement one or more data filters. Pre-regression filtering may remove points for low usage or points at out-of-range (hi or lo) power levels. The processing may also implement a post-regression filter. For example, after a first regression calculation, points too far off the line (hi residual value) are removed, and a new regression line is calculated from the remaining data.

The inventive capacity analysis techniques for wireless communication networks may be embodied in methods or in systems adapted to perform the analysis. The analysis techniques may also be embodied in unique software for implementing the inventive capacity analysis for a wireless network. A software product, in accord with this aspect, includes at least one machine-readable medium and information carried by the medium. The information carried by the medium may be executable code, one or more databases and/or information regarding carrier or code usage of the cells and/or sectors, as used in the preferred analysis.

A machine readable medium, as used herein, may be any physical element or carrier wave, which can bear instructions or code for performing a sequence of steps and/or associated data in a machine-readable form. Examples of physical forms of such media include floppy disks, flexible disks, hard disks, magnetic tape, any other magnetic medium, a CD-ROM, any other optical medium, a RAM, a ROM, a PROM, an EPROM, a FLASH-EPROM, any other memory chip or cartridge, as well as media bearing the software in a scannable format. A carrier wave type of medium is any type of signal that may carry digital information representative of the data or the instructions or code for performing the sequence of steps. Such a carrier wave may be received via a wireline or fiber-optic network, via a modem, or as a radio-frequency or infrared signal, or any other type of signal which a computer, processor or the like may receive and decode. The wires, fibers, etc. bearing the carrier-wave signals may also be considered as media.

Additional objects, advantages and novel features of the embodiments will be set forth in part in the description which follows, and in part will become apparent to those skilled in the art upon examination of the following and the accompanying drawings or may be learned by production or operation of the embodiments. The objects and advantages of the inventive concepts may be realized and attained by means of the methodologies, instrumentalities and combinations particularly pointed out in the appended claims.

BRIEF DESCRIPTION OF THE DRAWINGS

The drawing figures depict preferred embodiments by way of example, not by way of limitations. In the figures, like reference numerals refer to the same or similar elements.

DETAILED DESCRIPTION OF THE EMBODIMENTS

The various techniques, systems and programs disclosed herein relate to analysis of usage and power data in a wireless network to predict capacity and/or estimate current usage of certain resources of a wireless communication network. Performance-related metrics may also be provided. Reference now is made in detail to the presently preferred embodiments, examples of which are illustrated in the accompanying drawings and discussed below.

Figure 1:
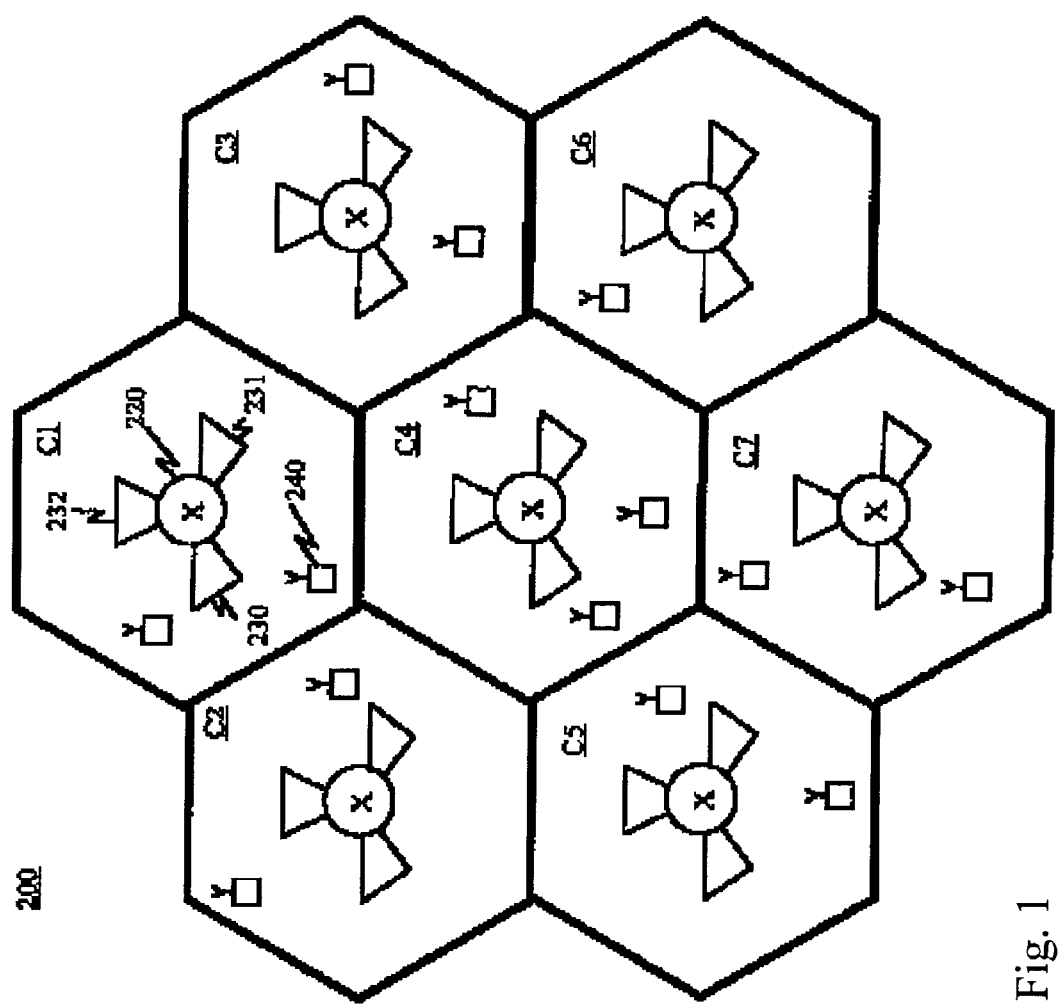
FIG. 1 is a somewhat idealized geographic layout diagram, which illustrates several cells of an exemplary wireless communication network.

FIG. 1 shows the idealized geographic layout of several cells of an exemplary wireless communication network, to which a process that predicts resource capacities and/or usage may be applied. In FIG. 1, the network 200 includes several contiguous wireless coverage areas, or cells, C1–C7. While the network diagram shows only seven cells, in practice, the actual number of cells may be much larger or smaller.

Each of the cells C1–C7 includes a base station 220 at the site marked by the X. The base station 220 is the part of radio network that sends and receives RF signals to/from the mobile stations 240 it currently serves. The base station 220 contains the antenna systems, towers, transmitters, and receivers at a site. A base station 220 is responsible for the control, monitoring, and supervision of calls made to and from each mobile station 240 within its serving area. Base station 220 assigns and reassigns channels to the mobile stations 240 and monitors the signal levels to recommend hand-offs to other bases stations 220.

In the example, the base station 220 in each cell C has three directional antennas 230–232 to provide communications into three sectors. Those skilled in the art will recognize that some cells may utilize omni-directional antennas. Also, sectorized cells C may have as few as two directional antennas or more than three directional antennas, to divide the cells into fewer or more sectors, as deemed appropriate for the particular service area. Each of the directional antennas 230–232 radiates downlink communications on at least one carrier and receives uplink communications on at least one carrier. In most high-traffic areas, each of the directional antennas 230–232 radiates communications signals and receives signals on two carriers and may in fact communicate in each direction on six or more carriers.

Via these carriers, the base station 220 provides wireless communications, for example, for voice and/or data traffic, to and from one or more mobile wireless stations 240 within the respective cell C. The base station 220 is a conventional base station that receives information from and transfers information to the wireless stations 240. Each wireless station 240 communicates with the base station 220 in a well known manner.

The inventive techniques are applicable to a wide range of different types of wireless communications networks. In the embodiments, the air-link communications between the base stations 220 and the mobile stations 240 utilize code-division multiple access (CDMA) type spread spectrum communications, for example, in a system operating in accord with the IS-95 standard or a next generation wireless network such as might operate in accord with 3rd Generation Partnership 2 (3GPP2), Wireless IP Network Standard, 3GPP2 P.S0001-B, Version 1.0.0, © 3GPP2, version date Sep. 17, 2001.

The intent is to provide an enhanced technique for determining capacity of an air-link resource of a base station in such a wireless communication network. In general, the technique involves recording level of usage of the air-link resource of the base station by wireless remote stations, and recording a base station power level of communications signals associated with the air-link resource of the base station, during each of a number of intervals, for example for each hour of a day, week, 10-day period, or month (e.g., 30 days). The preferred study collects data 24-hours each day for a month or a 30-day period. However, it is possible to use less data although an amount of data corresponding to 10 days and 19 hours per day is believed to be the current minimum, which will achieve for the desired level of accuracy.

In a typical CDMA network, the recorded base station power level is a power level of signals transmitted on a carrier from one of the sectors (from antenna 230, 231 or 232) of the base station 220, although the technique is also applicable to power level of an uplink communication to the base station sector. If the sector uses two or more carriers, the methodology can be duplicated to determine capacity for each carrier. If the network 200 uses code division techniques similar to those in IS-95, a critical resource on each carrier is the Walsh codes utilized for subscriber communications, hence, an embodiment measures usage of the Walsh codes for communications carried on the respective carrier of the one sector, during each respective interval.

Various units of measure can be used with the analysis technique with equivalent utility. The power level recorded preferably is the peak power of transmissions of the carrier of the one sector, during each respective interval, e.g., in dBm. Average power (e.g., in Watts) may be used instead of peak power, although it is believed that peak power provides more accurate results.

There are several common measures of communication network usage, originally developed as measures of usage of a telephone network, which are commonly used in traffic engineering. The "Erlang" is a measure of telephone traffic. One Erlang is equal to one hour of continuous communication, for example, for a phone conversation. Centi-Call Seconds (CCS) refers to increments of one hundred seconds of resource usage, for phone conversation in our example. One hour of telephone traffic (one Erlang) equals 60×60÷100 or 36 CCS. Other useful measures include minutes of use (MOU), and more recently, usage of data networks have been measured in bits, cells or frames.

For usage in the capacity analysis technique, one can use CCS, Erlangs, minutes of use, digital bits, or any other conventional usage metric representing communications traffic on a carrier of the particular wireless network, in the embodiment, as the measure of use of Walsh codes used on the particular carrier. The flexibility in the usage metric allows the process to consider voice or data traffic (e.g., in a 3G1xRTT network), or any combination thereof, without specific treatments.

The capacity analysis technique further involves performing a linear regression on the recorded levels of usage and the recorded power levels, to calculate a regression line of usage versus power. An operational maximum power parameter, associated with the base station 220, is identified. This power parameter could be related in some manner to the intercept of the regression line on the power axis but preferably is related to a design parameter (or possibly a measured parameter) of the base station. The technique then entails determining maximum usage capacity from a usage level on the regression line corresponding in power level equal to the identified operational maximum power parameter.

The current usage can be estimated from the usage level corresponding to a predetermined percentile of the recorded levels of usage. The current embodiments utilize the 90th percentile of usage in the busy-hours for the days of the study period, as the estimate of actual usage. The difference between estimated maximum capacity and the estimate for current usage then represents a potential for future growth in usage on the particular sector carrier. In the embodiments, the capacity for growth is expressed as a ratio of the projected capacity to the calculated current usage level.

It is also useful to determine the slope of the regression line. As discussed more, later, the slope provides useful information about the efficiency of operation on the particular sector carrier. A higher slope represents a more efficient performance.

It may also be helpful to calculate some measure of accuracy regarding the capacity and usage estimates. The embodiments therefore calculate a correlation coefficient of the recorded levels of usage and the recorded power levels, to provide a confidence factor related to the accuracy of the regression line.

To improve the accuracy of the capacity estimation process, it is contemplated that embodiments may use one or more data filtering techniques. For example, it is possible to filter-out usage vs. power data points, from the recorded data, before performing the linear regression. Data points that exhibit an out-of-range characteristic are removed. Examples of appropriate out-of-range filtering for this pre-regression function include: removal of data points wherein usage during an interval is below a threshold value, removal of data points wherein power during an interval is below a threshold value; and removal of data points wherein power during an interval is above a limit value.

Another filtering technique that may be useful in improving accuracy involves a post-regression filtering and calculation of a new regression line based on the filtered data. In an embodiment of this type of filter operation, usage versus power data points are removed if the points have a residual difference from the regression line greater than a threshold value. After removal of such data points, the processing involves a new linear regression performed on recorded levels of usage and recorded power levels remaining after the filtering. This subsequent processing generates a new regression line of usage versus power.

It is believed that the prior art would steer investigators from the particular process outlined above. All prior art apparently relies on queuing theory and the Erlang model of call service. The Erlang model has long been a mainstay of traditional telephone company planning. However, the Erlang model is predicated on discrete, equal, limited resources (e.g., lines, or "trunks" in telephony parlance). While transmit (or received) power is a limited resource, it is not discrete, nor is it equally shared among users. One of the basic principles of CDMA is that users are allocated exactly "enough" power to provide service, but no more. Therefore, all users use a different amount of power, and they cannot be treated as equal resource demands.

The lack of reliance upon queuing theory is one advantage of the current capacity analysis process. Using power, for example, stated in dBm, results in improved extrapolation accuracy over previous embodiments, which use Watts. The process as a whole permits unique capacity derivations per sector-carrier, rather than forcing an average, fixed assumptive value upon entire systems. The various outputs provide valuable operational information that can assist operators in optimizing their networks for maximum overall capacity.

Figure 2:
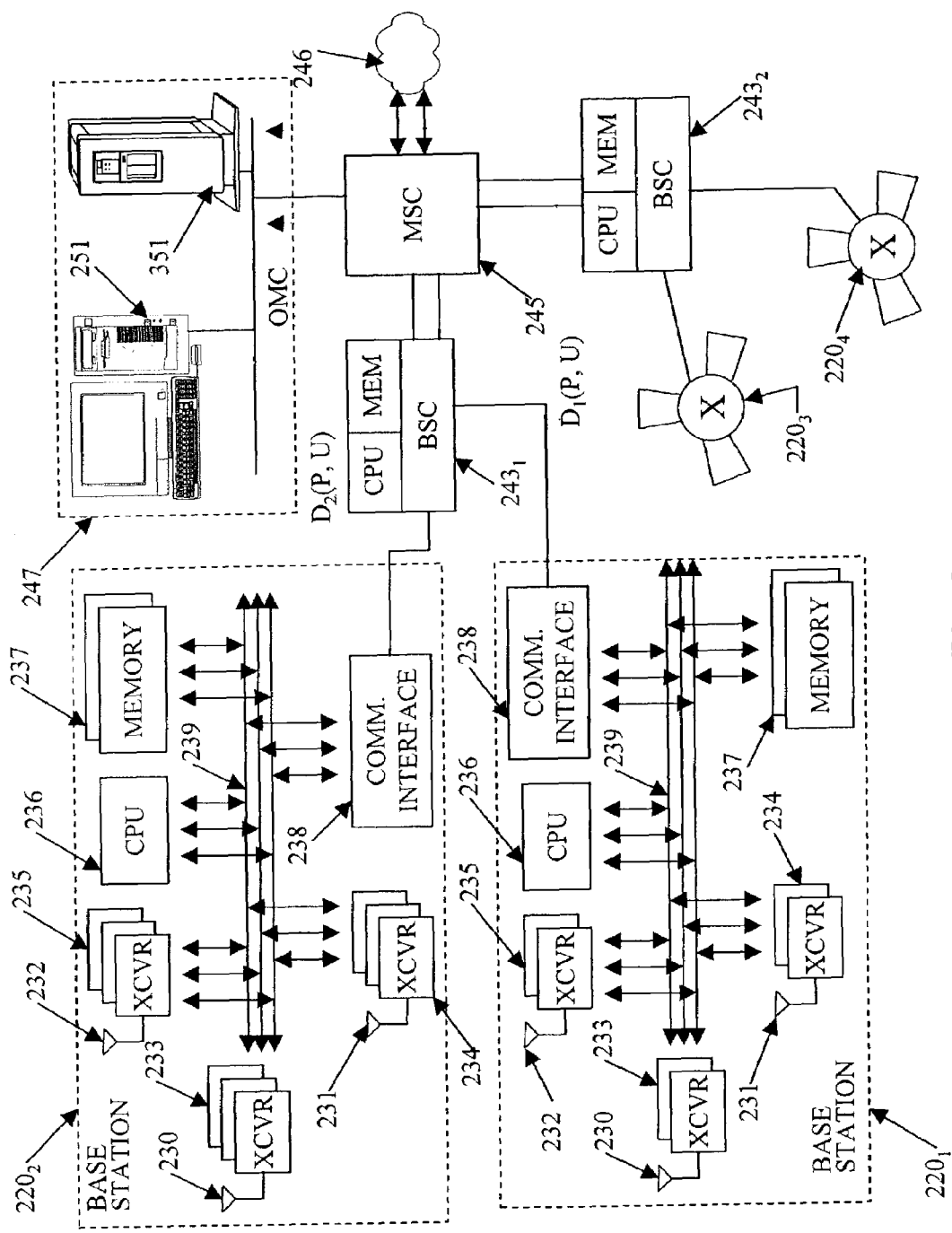
FIG. 2 is a functional block diagram of certain elements of the wireless communication network of FIG. 1, useful in explaining the data accumulation and processing for capacity analysis.

To better appreciate the application of the capacity analysis techniques to a network, it may be helpful to consider a more detailed example of a wireless communications network. FIG. 2 provides a block diagram of major elements of the network 200 for providing wireless communications services as well as certain systems that receive and process the data for capacity analysis. The portion the network illustrated in FIG. 2 includes four base stations $220_1$, to $220_4$, two of which are shown in somewhat more detail for discussion purposes.

As noted, each base station 220 contains the antenna systems 230, 231 and 232 and associated radio transmitters and receivers (transceivers). In current networks, each sector may use a single downlink carrier, although typically each sector has from 2 to 6 assigned downlink carriers and corresponding uplink carriers. In the illustrated example, the base station $220_1$, provides service using two carriers for each sector. Hence, there are two transceivers 233 associated with the first sector antenna 230, there are two transceivers 234 associated with the first sector antenna 231, and there are two transceivers 235 associated with the first sector antenna 232. By contrast, the base station $220_2$ provides service using three carriers for each sector. Hence, in the base station $220_2$, there are three transceivers 233 associated with the first sector antenna 230, there are three transceivers 234 associated with the first sector antenna 231, and there are three transceivers 235 associated with the first sector antenna 232. Except for the assigned carriers, the various transceivers are the same and operate in essentially the same manner. The capacity analysis techniques may be applied to each individual carrier, in either one or both directions, for any or all sectors of any selected one or more of the base stations.

Each base station 220 includes a central processing unit (CPU) 236 and one or more memories 237 for storing data and programming used and/or executed by the CPU 236. The memories 237 may be any known conventional memory for readable storage and/or read-write storage of code or data. The CPU 236 controls all operations of the respective base station 220. For example, under program control, the operation of the CPU 236 causes the respective base station 220 to control, monitor, and supervise calls made to and from each mobile station 240 within its serving area. As part of this operation, the CPU 236 of the base station 220 assigns and reassigns logical channels to the mobile stations 240 and monitors the signal levels to recommend hand-offs to other bases stations 220.

As it performs its control functions, the CPU 236 also performs certain operations monitoring and reporting functions. For example, the CPU 236 is aware of resource usage by the various base station transceivers as well as power levels utilized in transmission or received by the respective base station transceivers. The CPU 236 initially stores this data in one of the memories 237. As discussed more, later, the CPU 236 also initiates transmission of the data to appropriate processing equipment, to facilitate the capacity analysis operations.

Communications to and from the base station, with other network nodes utilize one or more links, typically in the form of wired or optical landline connections. For these communications, each base station 220 will include one or more interfaces 238. Signals for individual communications via the interface 238 are internally routed to and from the appropriate one of the transceivers 233–235 via an internal network, shown by way of example as a bus 239. The bus also provides control and signaling links between the transceivers and the CPU 236 as well as CPU access to the memory 237. For intra-cell communications, some subscriber traffic may go back and forth between two of the transceivers 233–235, without leaving the internal base station network, for example, if the called and calling party are both using mobile station 240 within the one cell C.

In the illustrated example, groups of base stations 220 connect to base station controllers (BSCs) 243. For example, base stations $220_1$ and $220_2$ connect to BSCs $243_1$, whereas base stations $220_3$ and $220_4$ connect to BSCs $243_2$. Each BSC 243 connects to a mobile switching center (MSC) 245. A BSC 243 is a centralized processor that controls the functions of a number of the base stations 220 and helps to manage how calls made by each mobile station are transferred (or "handed-off") from one serving base station to another. Each wireless network equipment vender implements this function differently. Some vendors have a physical entity, which they call a BSC, while other vendors include this functionality as part of their mobile switching center (MSC).

Among its elements, the BSC includes a central processing unit (CPU) and one or more memories (MEM). Along with its other control and monitoring functions, the BSC receives and temporarily stores usage and power level data generated by the base stations under its control. As discussed more, later, each BSC periodically uploads batches of this data, in this case, for processing by the capacity analysis tool.

The MSC 245 provides switching between the base stations 220, for example for communications between mobile subscriber stations 220, as well as switching of communications to and from other networks represented generically by the network cloud 246. For the ubiquitous telephone service, the MSC 245 provides switching between the base stations 220 and the public switched telephone network. The MSC 245 also provides switching to and from other mobile switching centers (not shown). In more advanced networks, one or more nodes of the network (not separately shown) also provide a packet switched coupling to a wide area data network, for Internet access and/or for private Intranet services.

The carrier that operates the network 200 will typically operate some type of network operations center, represented for example by the Operations-Maintenance Center (OMC) 247. The center communicates with various network elements via logically private data communications links. The illustrated network utilizes channels on the same media and through the same nodes that carry traffic, rather than a physically separate network. Hence, the drawing shows the center 247 with a communication link to the MSC 245, to enable two-way data communications for the center 247. Other implementations might use a separate private data network.

OMC 247 will typically include a number of workstation terminals 251, for use by operations and engineering personnel of the carrier. The center also may include one or more host computers or servers 351. A data network, such as a local area network (LAN) enables two-way data communication between the terminal stations 251 and the server 351.

In a network of the type illustrated in FIGS. 1 to 4, each base station 220 reports usage and power data, for each sector served by the base station 220 and for each carrier used by one of the base station transceivers 233 to 235, to the server 351. For example, the base station $220_1$ sends power and usage data $D_1(P, U)$ through the network to the server 351 in the network operations center 247. Similarly, the base station $220_2$ sends power and usage data $D_2(P, U)$ through the network to the server 351 in the OMC 247. In initial implementations, these communications entail receipt and temporary storage of the data in the BSC and a batch process to periodically upload data to the server 351.

The server 351 accumulates the usage and power data over some designated time period for a study, for example, a day, a week, a 10-day period, 30 days or a month, or the like. The server 351 processes the raw data to obtain usage and power levels for hourly intervals, e.g., peak power for each hour and total code usage during each hour (for example total Walsh code usage during each hour). At the end of the study period, a user's workstation 251 pulls the hourly data from the server 351 and processes the data to perform the regression and associated calculations, to produce study results in accord with the inventive capacity estimation techniques. The terminal station 251 then makes the results available to the carrier's personnel.

The capacity analysis may utilize any appropriate hardware for the host/server 351 or for the terminals 251 for the use by the carrier's operations and engineering personnel. The functions may be implemented on a single computer. As shown, the bulk data storage and binning of data operations run on a server 351. The user sets-up studies and reviews results via a terminal 251, and in present embodiments, the terminal performs the regression and associated calculations. It is also conceivable that the storage and analysis functions could reside on more machines in a more distributed architecture. Preferred embodiments utilize general purpose computers. It is presumed that readers are familiar with the structure and operation of such electronic devices. However, for completeness, in may be helpful to provide a summary discussion here of certain elements and functions of the general purpose computers.

Figure 3:
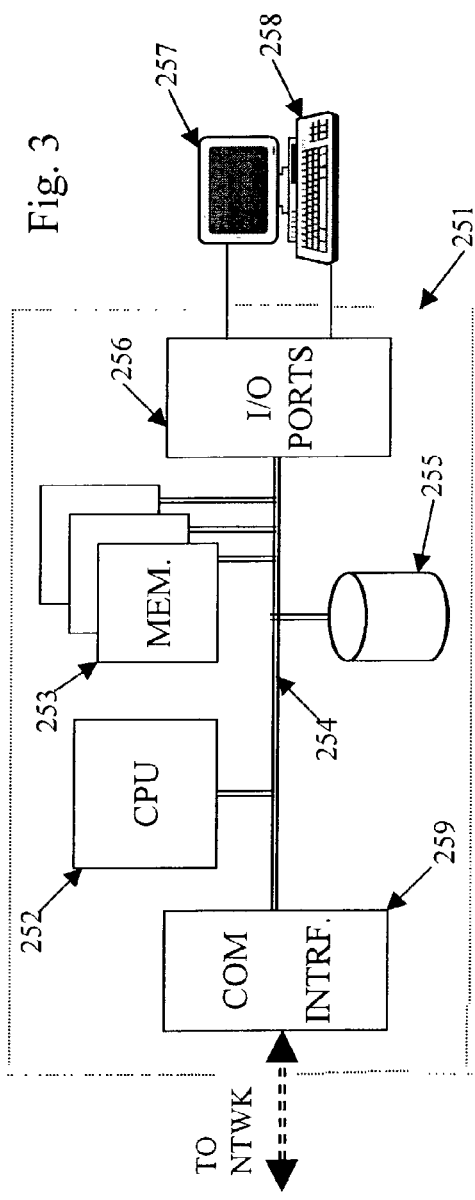
FIG. 3 is a functional block diagram of a general purpose computer for use as a workstation or the like, in the network of FIG. 2.

FIG. 3 is a functional block diagram of a PC or workstation type implementation of a system 251, which may serve as one of the user terminals, for use by carrier personnel conducting various analyses of network operations.

The exemplary computer system 251 contains a central processing unit (CPU) 252, memories 253 and an interconnect bus 254. The CPU 252 may contain a single microprocessor, or may contain a plurality of microprocessors for configuring the computer system 252 as a multi-processor system. The memories 253 include a main memory, a read only memory, and mass storage devices such as various disk drives, tape drives, etc. The main memory typically includes dynamic random access memory (DRAM) and high-speed cache memory. In operation, the main memory stores at least portions of instructions and data for execution by the CPU 252.

The mass storage may include one or more magnetic disk or tape drives or optical disk drives, for storing data and instructions for use by CPU 252. For a PC, for example, at least one mass storage system 255 in the form of a disk drive or tape drive, stores the operating system and application software as well as data, such as received messages and documents. The mass storage 255 within the computer system 251 may also include one or more drives for various portable media, such as a floppy disk, a compact disc read only memory (CD-ROM), or an integrated circuit non-volatile memory adapter (i.e. PC-MCIA adapter) to input and output data and code to and from the computer system 251.

The system 251 also includes one or more input/output interfaces for communications, shown by way of example as an interface 259 for data communications via a network. The interface 259 may be a modem, an Ethernet card or any other appropriate data communications device, for digital communications of various types via a data network. The physical communication links may be optical, wired, or wireless (e.g., via satellite or cellular network). This interface enables the terminal system 251 to communicate with the server 351, for example to pull down the hourly usage and power level data.

The computer system 251 may further include appropriate input/output ports 256 for interconnection with a display 257 and a keyboard 258 serving as the respective user interface. For example, the computer may include a graphics subsystem to drive the output display 257. The output display 257 may include a cathode ray tube (CRT) display or liquid crystal display (LCD). Although not shown, the PC type system typically would include a port for connection to a printer. The input control devices for such an implementation of the system 251 would include the keyboard 258 for inputting alphanumeric and other key information. The input control devices for the system may further include a cursor control device (not shown), such as a mouse, a touchpad, a trackball, stylus, or cursor direction keys. The links of the peripherals 257, 258 to the system 251 may be wired connections or use wireless communications.

Each computer system 251 runs a variety of applications programs and stores data, enabling one or more interactions via the user interface, provided through elements such as 257 and 258, and/or over the network to implement the desired processing for the capacity analysis. The customer computer 251 for example, might run a general purpose browser application, and may run other general-purpose applications, such as an e-mail program, for the business functions of the operations personnel. If the server performed the analysis computations, the terminal browser might be used to access results in a web page format. In current embodiments, the terminal station 251 runs a Capacity Trending Tool, as a local application to pull-down the data, perform the linear regression and associated calculations and generate various displays of the results. The Tool may also provide a graphical user interface to allow set-up of data accumulation for new studies.

Figure 4:
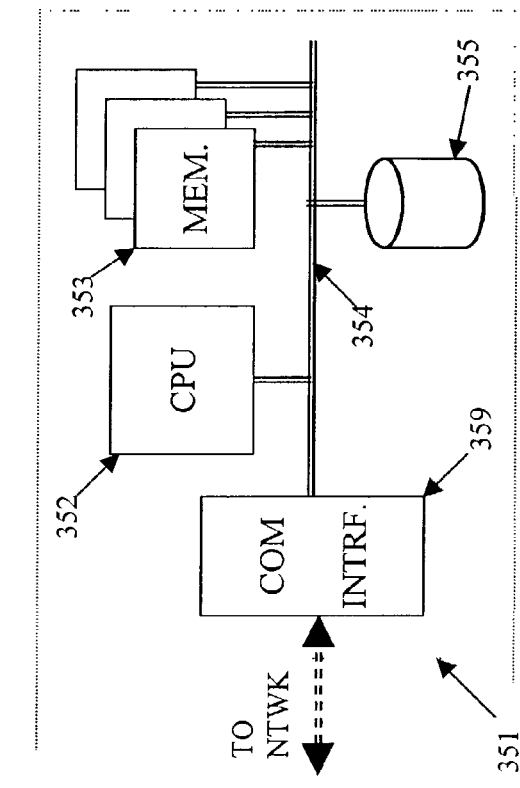
FIG. 4 is a functional block diagram of a general purpose computer for use as a server or host computer or the like, in the network of FIG. 2.

FIG. 4 is a functional block diagram of a general purpose computer system 351, which may perform the functions of the host or server 351, for storage of the usage and power database, or the like. It may also be possible that the server executes the processing of that data to perform the regression and attendant calculations.

The exemplary computer system 351 contains a central processing unit (CPU) 352, memories 353 and an interconnect bus 354. The CPU 352 may contain a single microprocessor, or may contain a plurality of microprocessors for configuring the computer system 352 as a multi-processor system. The memories 353 include a main memory, a read only memory, and mass storage devices such as various disk drives, tape drives, etc. The main memory typically includes dynamic random access memory (DRAM) and high-speed cache memory. In operation, the main memory stores at least portions of instructions and data for execution by the CPU 352.

The mass storage may include one or more magnetic disk or tape drives or optical disk drives, for storing data and instructions for use by CPU 352. At least one mass storage system 355, preferably in the form of a disk drive or tape drive, stores the report data D from the base stations 220. The mass storage 355 may also include one or more drives for various portable media, such as a floppy disk, a compact disc read only memory (CD-ROM), or an integrated circuit non-volatile memory adapter (i.e. PC-MCIA adapter) to input and output data and code to and from the computer system 351.

The system 351 also includes one or more input/output interfaces for communications, shown by way of example as an interface 359 for data communications via the network. The interface 359 may be a modem, an Ethernet card or any other appropriate data communications device. The physical communication link may be optical, wired, or wireless (e.g., via satellite or cellular network). Alternatively, the computer system may comprise a mainframe or other type of host computer system capable of web-based communications via the Internet. In the embodiment, the data communications D between the base stations 220 and the server 351 utilize logically separate channels over the same landline media that provide the traffic and signaling links from the base stations 220 to the BSCs 243 and from the BSCs to the MSC 245. The logically separate channels, however, form the equivalent of a private data communication network. Those skilled in the art will recognize that other data network arrangements may be used to carry the report data to the server 351. The same or another interface provides data communications with the terminal station(s) 251.

Although not shown, the system 351 may further include appropriate input/output ports for interconnection with a local display and a keyboard or the like serving as a local user interface for programming purposes. Alternatively, the server operations personnel may interact with the system 351 for control and programming of the system from a terminal 251 or from a remote terminal device via the Internet or some other network link.

The computer system 351 runs a variety of applications programs and stores the accumulated usage data. In the present embodiments, one such program causes the server to store received usage and power level data, develop hourly data sets and make those data sets available to the terminal stations 251. In another embodiment, one or more such applications might enable the delivery of analytical results as web pages and/or other report formats to the terminals 251. Those skilled in the art will recognize that the computer system 351 may run other programs and/or host other network operations applications. Also, the system 351 may be implemented as a single computer system or as a distributed system having multiple appearances at different nodes on the Internet.

The components contained in the computer systems 251 and 351 are those typically found in general purpose computer systems used as servers, workstations, personal computers, network terminals, and the like. In fact, these components are intended to represent a broad category of such computer components that are well known in the art.

Aspects of invention may relate to a method, to a network or to systems, for performing the capacity analysis. Other aspects may relate to software products, typically carried on one or more machine-readable media, which cause a computer to perform the inventive capacity analysis based on received usage and power data.

The term "machine-readable" medium as used herein refers to any medium that participates in providing instructions and/or data to a programmable processor, such as 236, 252 or 352, for execution or other processing. Such a medium may take many forms, including but not limited to, non-volatile media, volatile media, and transmission media. Non-volatile media include, for example, optical or magnetic disks, such as storage device 255 or 355. Volatile media include dynamic memory, such as main memory 253 or 353. Physical transmission media include coaxial cables; copper wire and fiber optics, including the wires that comprise a bus such as 239, 254 or 354. Transmission media, however, can also take the form of electric or electromagnetic signals, or acoustic or light waves such as those generated during radio frequency (RF) and infrared (IR) data communications. Hence, common forms of machine-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, and EPROM, a FLASH-EPROM, any other memory chip or cartridge, a carrier wave transporting data or instructions, physical links bearing such a carrier wave, or any other medium from which a computer or the like can read in order to read or recover carried information.

Various forms of machine-readable media may be involved in carrying one or more sequences of one or more instructions to a processor 236, 252 or 352 for execution. For example, all or portions of the software to perform the regression processing may at times be communicated through the Internet or various other telecommunication networks. Such communications, for example, may serve to load the software from another computer (not shown) into the server 351, or the terminal station 251, or into another network element.

Figure 5:
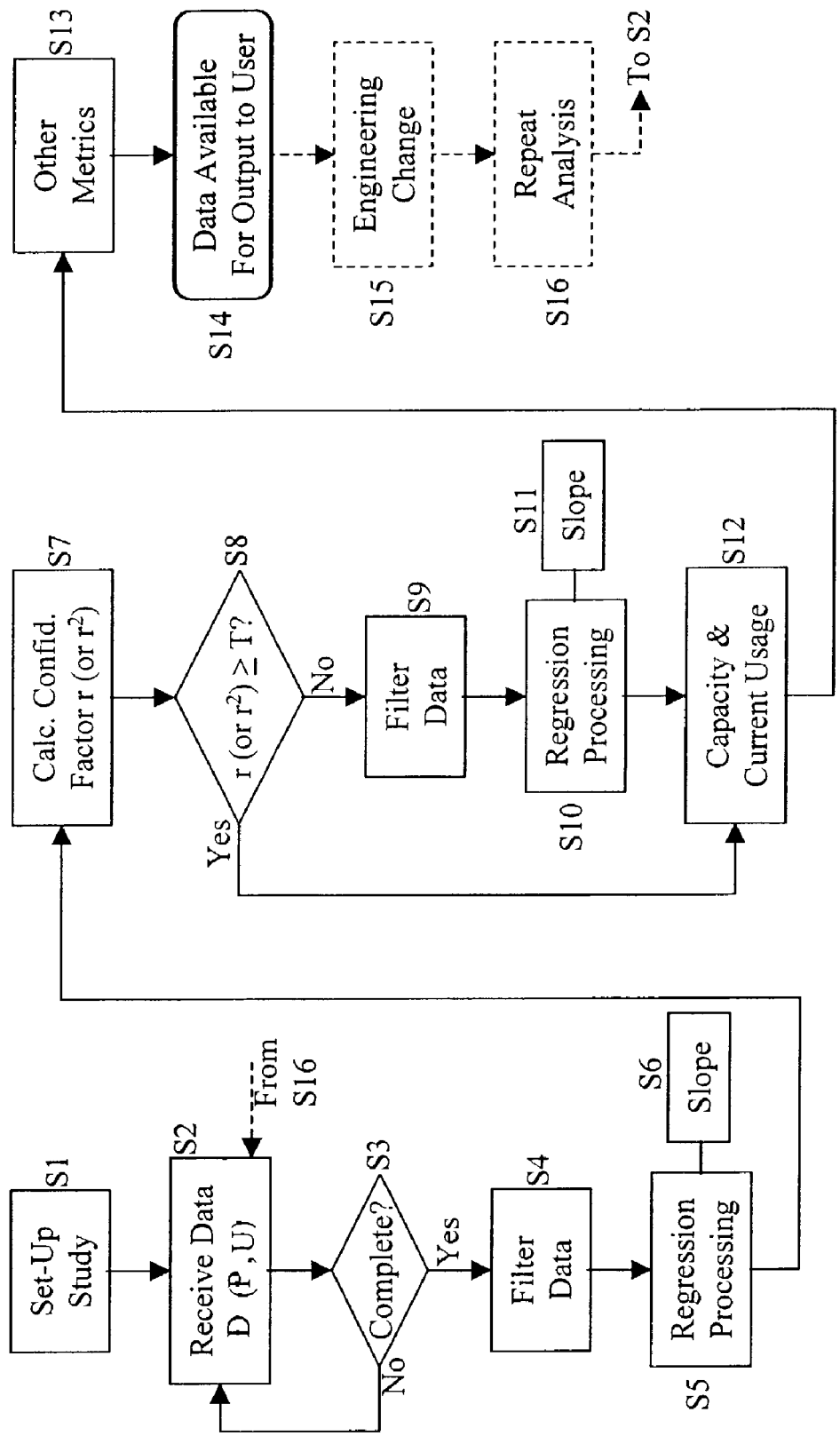
FIG. 5 is a flow chart useful in explaining an embodiment of a capacity analysis technique for a wireless communication network.

FIG. 5 is a simplified flow chart of an example of the processing to analyze capacity associated with a carrier of a sector, in the network of FIGS. 1 to 4. The process flow begins at step S1, wherein the user accesses the system through one of the terminal computers 251 to set-up a particular study. The user selects the particular resource for study, in this case the cell site (or base station), the sector and the carrier. The user may also select certain parameters, such as the length of the study and/or the time increments, if those parameters are variable. Often, the base station is already reporting this and other operation data, and set-up of the study entails collecting the relevant data in the server, over the study period, in a manner usable for the capacity analysis. If data is not yet being reported, it may be necessary to program the particular base station 220 to report the data in the selected manner to the server 351, at least for the length of the designated study period.

Once the study is initiated, the server 351 will periodically receive power and usage data D (P, U) relating to the sector carrier, from the selected base station (step S2). In a network of the type illustrated in FIGS. 1 to 4, each base station CPU 236 will accumulate usage and power data in the associated memory 237, for each sector served by the base station 220 and for each carrier used by one of the base station transceivers 233 to 235. Typically, the BSC 243 will accumulate this data for some set time interval, such as an hour (although other time increments may be used). At the end of the interval, the BSC 243 will upload the data to the server 351, which in turn will calculate certain parameters from the data, such as overall Walsh code usage over the hour and peak or average power over the hour, for each sector carrier. The power data may be for up-link carriers, but in the example, the power is that of each downlink or forward carrier and is measured as a peak power in dBm.

As the server 351 receives these periodic reports, it accumulates and stores the data D(P, U), calculates the data pairs for each interval (e.g., each hour) and stores the hourly data pairs in a database or the like. The server 351 also checks to determine if the study period for the particular resource is complete (step S3). In an example where the user sets-up a one-month study of a carrier of one cell-site sector, the server 351 checks to determine if the study has been running for a month. If not, the server 351 returns to step S2 and awaits receipt of additional data from the base station.

At the end of the period for the study, that is to say after the month ends in our example, the process flow branches from step S3 to step S4, and the server makes the complete set of data pairs available to the user terminal station 251, and the station 251 begins its routine for processing of the usage and power data.

In the illustrated example, step S4 involves pre-regression filtering of the data points representing the hourly measurements of the peak power and the Walsh code usage for the particular sector-carrier. For example, the processing may filter-out usage vs. power data points, from the recorded data points that: exhibit usage during an interval that is below a first threshold value, exhibit power during an interval that is below a second threshold value; and/or exhibit power during an interval that is above a third threshold value. The user may have the option to select which filter(s) to apply to a particular study, and/or the threshold(s) for the selected filter (both post and pre-regression).

The capacity analysis technique further involves performing a linear regression on the recorded levels of usage and the recorded power levels, to calculate a regression line of usage versus power (step S5). For purposes of discussion, the x-axis represents the carrier power during respective time intervals, for example, peak power in dBm. The y-axis represents the usage data of each interval, for example, is CCS. Of course, those skilled in the art that the approach discussed below remains applicable even if the order of the variables reverse, e.g. such that the x variable would be usage and the y variable would be power.

Initially, the regression processing involves calculating a series of intermediate parameters. The first such intermediate parameter is:

$$S_{xx} = \sum_{i=1}^{n} (x_i - \bar{x})^2 \tag{1}$$

In equation (1), $x_i$ is the peak power value in each respective interval. The calculation involves determining the difference between the individual power levels and the average peak power over all intervals (the entire study period), squaring each difference, and summing the squares for all data points (i.e., for all intervals).

The second intermediate parameter is:

$$S_{yy} = \sum_{i=1}^{n} (y_i - \bar{y})^2 \qquad (2)$$

In equation (2), $y_i$ is the Walsh code usage value in each respective interval. The calculation involves determining the difference between the individual usage levels and the average usage level over all intervals (the entire study period), squaring each difference, and summing the squares for all data points (i.e., for all intervals).

The third intermediate parameter is:

$$S_{xy} = \sum_{i=1}^{n} (x_i - \bar{x})(y_i - \bar{y}) \qquad (3)$$

This intermediate term is the sum of the products of the differences between the individual and average values.

The actual values of slope and one or more intercepts for defining the line, are then calculated by the following formulae:

$$b = \frac{S_{xy}}{S_{xx}} \text{ for the slope of regression line} \qquad (4)$$

$$a = \bar{y} - b\bar{x} \text{ for the y-intercept of regression line} \qquad (5)$$

$$x, \text{int} = \frac{-a}{b} \text{ for the } x\text{-intercept of regression line} \qquad (6)$$

This line of course can be drawn from any two of the formulae shown at (4) to (6). Preferably, part of the regression processing results in calculation of a slope b of the regression line (step S6). The slope provides useful information about the efficiency of operation on the particular sector carrier. A higher slope represents a more efficient performance. The x-intercept represents an estimate of static (no load) overhead power. Typically, the pilot power (a known parameter) should be approximately half the static overhead power.

The regression processing also involves calculation (step S7) of a correlation coefficient r of the recorded levels of usage and the recorded power levels. The formula for r is as follows:

$$r = \frac{S_{xy}}{\sqrt{S_{xx}S_{yy}}} \qquad (7)$$

The coefficient r may be used, but preferably the process calculates the value $r^2$, to provide a confidence factor related to the accuracy of the regression line. In the exemplary embodiment, the processing uses the confidence factor to determine whether the result appears to be sufficiently accurate (step S8). This may entail review by the user and a decision based on experience. If the decision is automated, for example, by the setting of a threshold T in the system, the decision branches to step S9 if the confidence factor is below the threshold T or skips to step S12 if the confidence factor is at or above the threshold T.

If the confidence factor is below the threshold T, it may be possible to perform further filtering and repeat the regression calculations. In step S9, usage versus power data points are removed if the points have a residual difference from the regression line greater than another threshold value. The residual of each datapoint $(x_n, y_n)$, that is to say, the difference between the regression estimated response and the actual response may be calculated as follows:

$$res_n = (\hat{y} - y_n) = b^* x_n + a - y_n \qquad (8)$$

Based on the residual value calculated by equation (8), the processing removes values where the residual exceeds an associated threshold value. After removal of such data points, the processing involves a new linear regression (Step S10) performed on the data points for usage and power levels remaining after the S9 filtering. The new regression also entails a new computation of the slope of the regression line S11. This subsequent processing generates a new regression line of usage versus power, and related parameters as desired, albeit using the same formulas (1) to (6) (and possibly (7) and (8)) as described above.

The regression processing also may produce certain related statistical parameters, for example, the standard deviation of measured data about regression line, as follows:

$$s = \sqrt{\frac{S_{yy} - bS_{xy}}{n-2}} \qquad (8)$$

The next step relates to computation of values for the capacity of the particular sector-carrier and current usage associated with that carrier (step S12). The projected "capacity" is a point on the regression line that corresponds to some power limit value imposed on the base station resource. The power limit value may be based on some estimated value (e.g., the x-intercept plus some offset), a known power limit set on the transceiver equipment, an offset from a known low-power parameter, or possibly from some field-measured power limit value.

To compute the capacity, an operational maximum power parameter, associated with the base station 220, is identified. This power parameter could be the intercept of the regression line on the power axis (x-intercept value from equation (6)) but preferably is a design parameter (or possibly a measured parameter) associated with the base station. In the downlink direction, for example, several limits are set in the control algorithms for the base station transceivers, to keep total transmit power from exceeding the capabilities of the equipment. One of these limits or a value related thereto may be used in the capacity analysis. In the preferred embodiment for down link analysis, the limit determination actually entails selecting the minimum from among three design parameters or related value(s), as follows:

Power_Limit(dBm)=Min(Overload_Power_Limit, Hardware_Power_Limit, Pilot_Power+ PeakEcIo)

The first possible value is the overload power limit value. The second possible value is the hardware power limit value. The third value is related to the pilot power, specifically by adding a constant related to an offset for peak interference compensation. The interference limit (as characterized by the offset PeakEcIo) is due to an assumed amount of same-frequency contribution by the same sector and carrier. The "hardware" limit is literally the power amplifier capability of equipment in the cell site. While the hardware limit is a fixed limit (due to transistor technology, manufacturer methods, etc.), the EcIo-based interference limit is actually a soft limit that the service provider can use as a parameter. Generally, allowing more interference (a larger absolute EcIo limit) gains capacity at the expense of quality. The overload limit is actually a provider-settable limit that is a feature functionality of the cell site. The best example of its use is: if the base station had an infinitely-large power amplifier, the network designer would set the overload limit to match what she believes to be the EcIo limit for a sector (considering the environment and where the network designer wants the network to operate on the capacity-quality tradeoff). With a finite power amplifier, however, the designer must consider the hardware limit in setting the overload limit—in some cases, the base station may not (for a variety of reasons) have a big enough power amplifier to support the desired EcIo limit, so operations personnel set the overload limit smaller (to match the hardware limit).

The values for the overload power limit, the hardware power limit, and the pilot power are design parameters used to set-up the base station, and most carrier's maintain a record of these values in a database or the like, which can be accessed to provide the values for use in the capacity analysis. The constant offset for peak interference compensation (PeakEcIo) is a user defined parameter that is set based on knowledge and experience, for example, from link budget calculations and/or field experiments. Current embodiments utilize an estimate of 9 dB for this offset value.

Picking the minimum of the three possible values for the power limit, in this manner, accounts for all of the different operational factors that truly limit the maximum transmit power of the base station transceivers. This approach also avoids aberrations, for example, due to inaccuracies in the power limit data in the carrier's operational database. If everything is set correctly at the base station and properly recorded in the carrier's database, the power limit should be the pilot power plus the offset (PeakEcIo). The offset is a user input, which may be considered as a network design parameter. If the intent is to design a higher capacity network, the user (design engineer) may opt for a larger value for this offset. In such a case, the study results, for example, might often show that the network can support a higher level of usage, and in many cases has excess capacity (growth factor ratio greater than 1).

Once the power limit parameter is selected, the capacity analysis technique then entails determining or projecting a maximum usage as the resource capacity, from a usage level on the regression line corresponding in power level equal to the identified operational maximum power parameter. The capacity calculation follows the following formulation:

$$Projected\_Capacity = slope * Power\_Limit + y\_intercept \quad (9)$$

The formula at (9) effectively calculates the usage level (y-value) for the point on the regression line that corresponds to the selected power limit (x-value).

In step S12, the current usage can be estimated from the usage level corresponding to a predetermined percentile of the recorded levels of usage. The current embodiments utilize the 90th percentile for busy-hour usage, as the estimate of actual usage. This preferred technique for the usage determination entails identifying the usage data level for the highest usage interval (busy hour) for each day of the study. In a 30 day study, for example, there would be 30 busy hours, and as a result, 30 data points for usage level in those hours. The preferred method involves picking the 90th percentile usage, e.g., the third highest busy hour usage in our 30-day example, as the current usage estimate. For display purposes, the estimate of the actual usage is shown as the data point on the regression line corresponding to the selected busy hour usage percentile.

In step S13, the processing may calculate one or more additional parameters of interest. For example, the difference between estimated maximum capacity and the estimate for current usage then represents a potential for future growth in usage on the particular sector carrier.

One such additional metric, useful as a statistical measure of accuracy at the estimated capacity point, is the confidence interval (CI), which is derived from the following:

$$CI = \pm t_{\frac{CI\_bound}{2}} * s * \sqrt{1 + \frac{1}{n} + \frac{(Power\_Limit - \bar{x})^2}{S_{xx}}} \quad (11)$$

where: "t" is the Student-t distributed statistic with (n-2) degrees of freedom. For example, if CI_bound is 95% and n>33, t=1.96.

When the regression line is calculated from a scattered group of data points, there is some range of estimation error in the resulting line. The error increases for distances along the line that are further from the data points used in the regression to derive the line. The value CI essentially indicates how tightly bound the data might be around the selected point, in this case, the point for estimated capacity. The tighter, the more accurate is the capacity estimate provided by the regression.

For each time period, the estimated potential for further increase in usage, before exhaustion of the resource, may be represented by:

$$Growth\_Factor = (Projected\_Capacity - CI) / Current\_Usage \quad (12)$$

As such, the Growth Factor is a ratio. If there is actual room for growth in usage, this ratio will have a value greater than 1. In some cases, however, the estimate of current usage may already meet or exceed the projected capacity, in which case, the Growth Factor ratio will have a value of 1 or less.

The data is made available for output to the user (step S14). For example, the user's terminal 251 may display the results in a window on the monitor 257 or provide a print out. Examples of displays will be discussed in a moment with respect to FIGS. 6 to 8.

However, to complete the discussion of FIG. 5, it should be noted that there are additional optional steps shown in dotted line form. One of the uses of the capacity analysis technique is as an operational tool. An operations engineer can review the graphical output and judge performance based on the results, for example, based on the slope of the regression line or comparison of results for different carriers/sectors of one cell site. For example, if results for one carrier are markedly different from those of others at the one base station, it indicates a problem.

If the performance is less than expected, the engineer may design a change in operating parameters for the base station (step S15). A technician implements the change to the base station in the field, for example, to increase one or more of the transmit power settings associated with a particular sector-carrier in the base station 220. The process (S16) then repeats (return to data collection at S2) to perform a second study with respect to the same resource. At the end of the second study, the engineer can compare the results available at step S14 from the two different studies to determine the degree in improvement in performance, e.g. from an increase in the slope of the regression line.

Assuming a Windows® computing environment, FIGS. 6 to 9 illustrate the displays as they might appear in a window, from each of four different resource studies, as they might result from the processing of FIG. 5.

Figure 6:
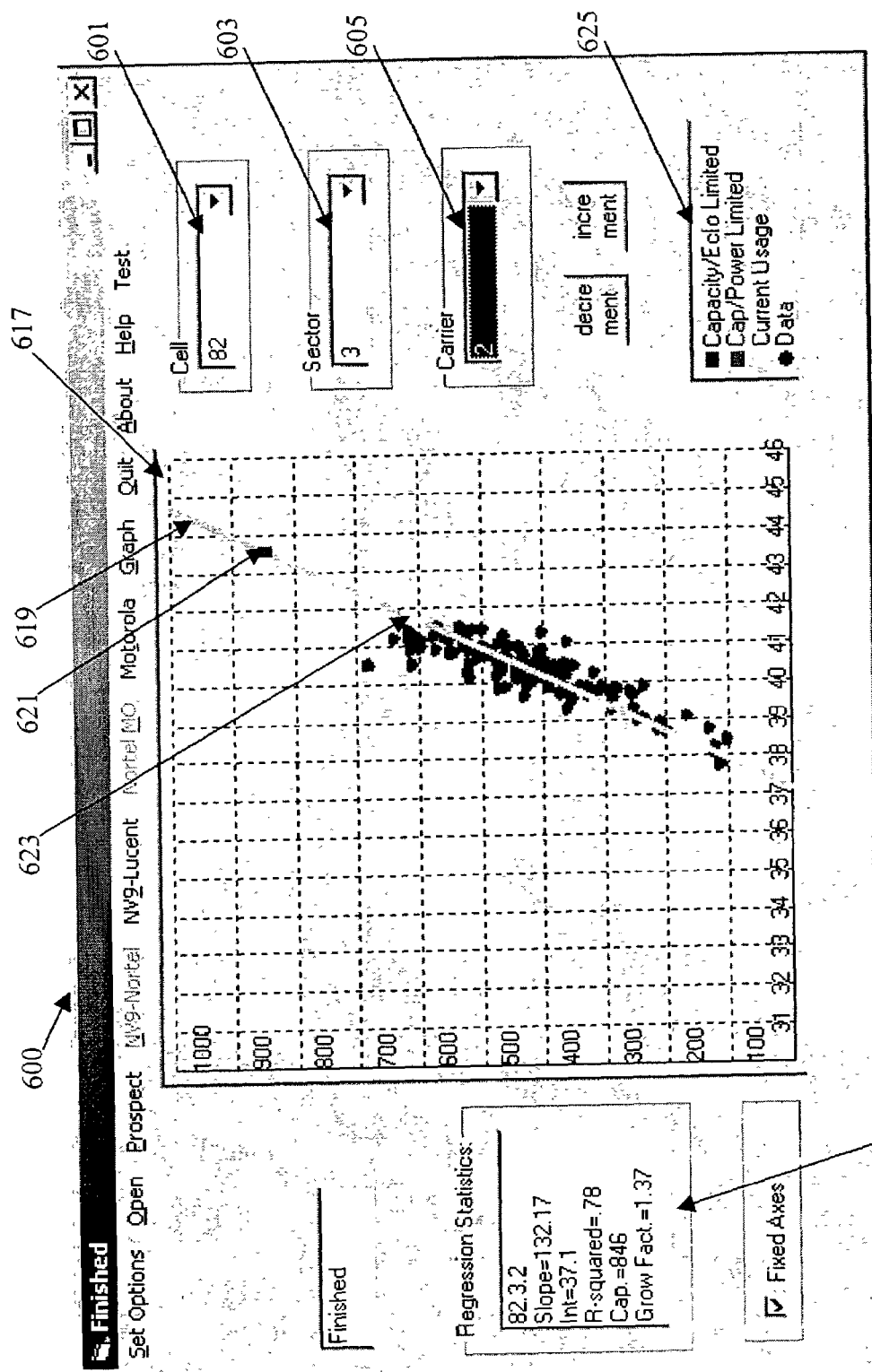
FIGS. 6 to 9 are exemplary window displays, illustrating output information from the capacity analysis tool.

It may be helpful to consider the example shown in FIG. 6 in somewhat more detail. As shown in that drawing, the window display 600 includes a box 601 for displaying a number identifying the cell site. The English name for the site may appear along the bottom of the window. For example, the display in FIG. 7 relates to the site at Empire Plaza. Returning to FIG. 6, a box 603 displays a number identifying the particular sector within that cell, and a box 605 displays a number identifying the particular carrier tested for that sector in the currently displayed study.

The displayed output of the capacity planning tool also includes a grid 611 summarizing the regression coefficients and calculation results for the studied sector carrier. In the example, the grid 611 includes the cell-sector and carrier ID data (82.3.2 in this example). The exemplary grid also contains the slope (132.17 for this example), and the intercept "Int" for the power (x) axis (shown as 29.6 in this example). The grid 611 for the regression statistics also shows the confidence factor, in this case the squared correlation coefficient ($r^2$), which in this example has a value of 0.78. The grid 611 for the regression statistics also shows the projected capacity for usage or "Cap" (846 for this example) and growth factor ratio (1.37 is this example).

The main feature of the illustrated window 600 is a graphical representation 617 of the processing results. In the first embodiment (FIG. 6), the graph 617 provides a scatterplot of all of the actual data points (solid black dots) as well as a plot 619 of the regression line. Several points along the regression line 619 are represented by different graphical symbols (or colors), to highlight data points of interest.

In the graph 617, the peak power (dBm) is on the x-axis, and the Walsh code usage (CCS) is on y-axis. As noted, the power could be the x-variable, and the usage could be the y-variable. In the example, the actual data points are shown as dark dots, and the regression line appears as a gray line 619 on the graph 617. The dark square 621 represents the "Capacity"—projected usage. If the square appears in one color, it would represent the usage at which pilot fraction is −10 dB (10%), for example, where the processing determined the capacity based on the interference limit (Pilot-Power+PeakEcIo). If the square 621 appears in a different color (listed in the legend but not shown on the graph in FIG. 6), the processing calculated the capacity based on selection of another minimum power parameter as the power limit. The white square 623 on the line 619 represents "Current Usage" for this period (90th percentile busy-hour).

In an actual embodiment, the elements in the graph would be colored for display on a color CRT or color LCD or the like. For example, the data dots might be dark blue, the line 619 might be light green, the capacity square 621 might be red (interference limited), and the current usage square 623 might be yellow. An alternate capacity square (e.g. for power limited capacity) might use a different color, such as light purple or pink.

The window display of the capacity tool output preferably will offer a means of visually inspecting, exporting, and printing a selected sector-carrier's raw data and calculated regression line on a scatter plot, such as shown in FIGS. 6 to 9. Preferably, the software will also offer means of visually inspecting, exporting, and printing a selected sector-carrier's raw data in tabular or spreadsheet form (not shown). The program may also offer means of generating and printing a histogram of any selected grid quantity for the entire session (e.g., Projected_Capacity).

Figure 7:
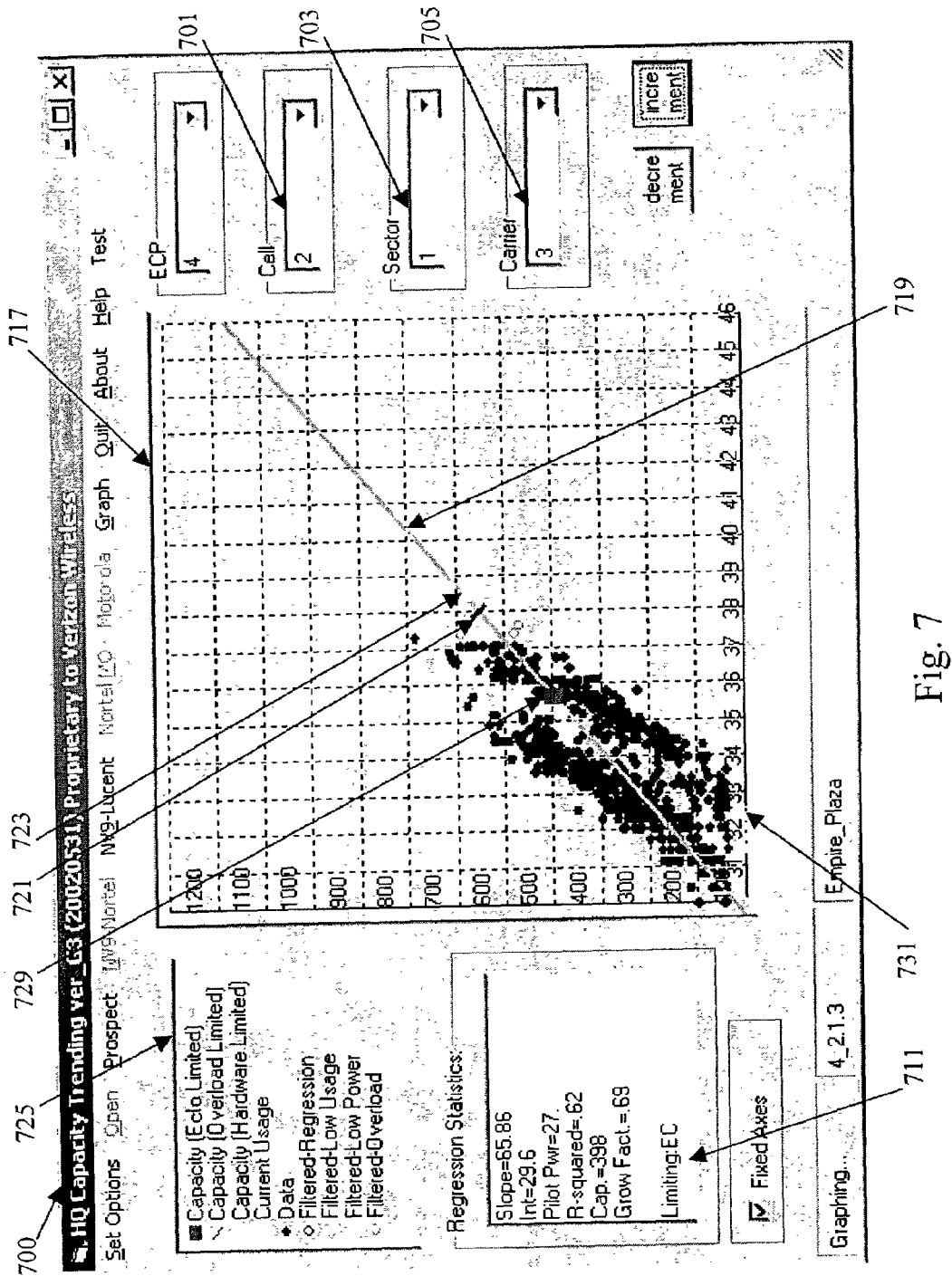
Figure 8:
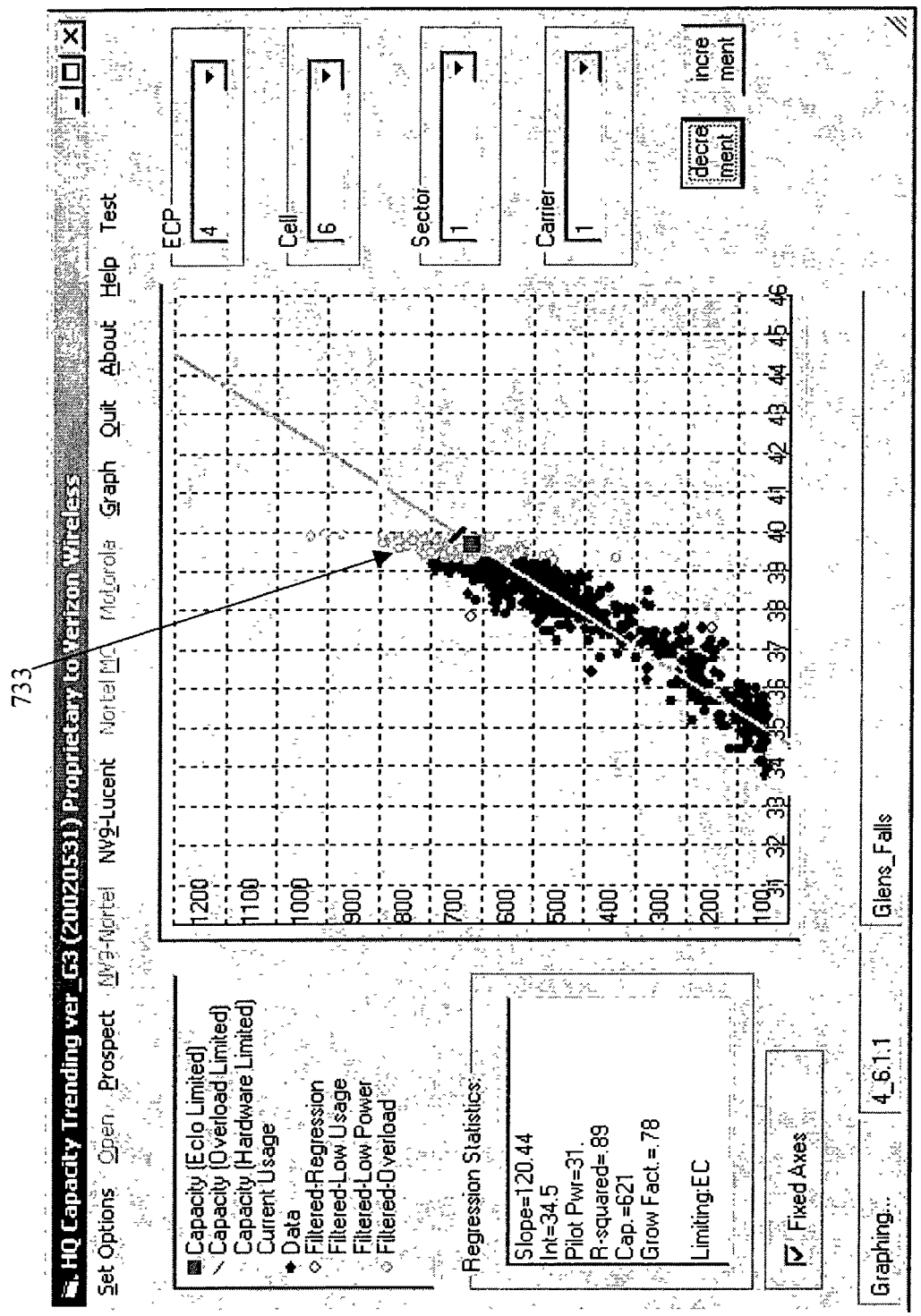
Figure 9:
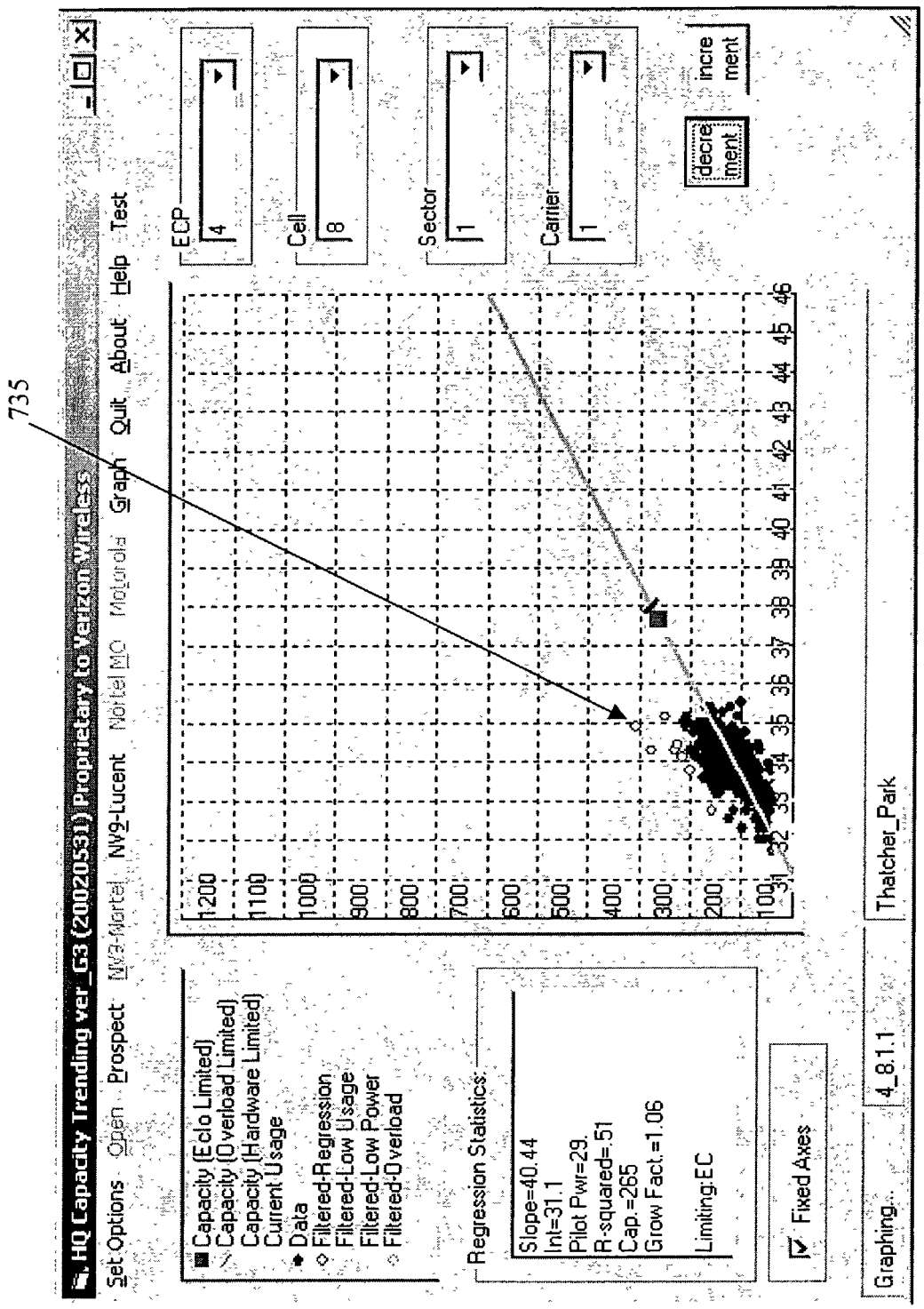

FIGS. 7 to 9 show a slightly different embodiment of the window display produced by an embodiment of the capacity analysis tool. It may be helpful to consider the example shown in FIG. 7 in somewhat more detail. As shown in that drawing, the window display 700 includes a box 701 for displaying a number identifying the cell site. In this version of the display, the English name for the site appears along the bottom of the window. A box 703 displays a number identifying the particular sector within that cell, and a box 705 displays a number identifying the particular carrier tested for that sector in the currently displayed study.

The displayed output of the capacity planning tool also includes a grid 711 summarizing the regression coefficients and calculation results for each sector carrier. In the example, the grid contains the slope (65.86 for this example), and the intercept "Int" for the power (x) axis (shown as 29.6 in this example). The grid 711 for the regression statistics also shows the confidence factor, in this case the squared correlation coefficient ($r^2$), which in this example has a value of 0.62. The grid 711 for the regression statistics also shows the projected capacity for usage or "Cap" (398 for this example) and the pilot power (e.g. 27) which may be used to derive the minimum power limit parameter in the capacity computation. This example, rather than showing a calculated current usage value in the grid 711, shows a growth factor (ratio) related to the fractional improvement possible based on the difference between the current usage (90th busy-hour percentile) and the projected capacity (Cap). The grid may also show the number of points used in the regression calculation (total points less filtered points).

Again, the main feature of the illustrated window 700 is a graphical representation 717 of the processing results. In the embodiment of FIG. 7, the graph 717 provides a scatterplot of the actual data points (solid black dots) as well as a plot 719 of the regression line. Several points along the line are represented by different graphical symbols (or colors), to highlight data points of interest. In the illustrated example, the current usage point 723 on the line is indicated by a white square.

In this embodiment, the graph may display one, two or three different projections of capacity, and the example shows two. Rather than just select the minimum power parameter, e.g. from among three possible values, the software may calculate one, two or three capacity values using one, two or all three of the possible power limit parameter values. Depending on the user settings for the study and display, the software may cause the computer to display any or all of the different possible projections for capacity. In the example, the graph 717 shows two of the three possible capacity calculations as identified points on the regression line 719. The projected capacity based on the interference limit (using Pilot_Power+PeakEcIo) is represented by a dark gray square 729. The projected capacity based on the overload limit power value is represented by a dark bar 721 across the regression line 719. Although not shown, the display could show the projected capacity based on the hardware limit power as a light gray bar across the regression line 719.

The output may be printed in black-and-white, to provide information in a manner similar to that shown in FIG. 7.

However, if intended for display on a color monitor or output via a color printer, the software would provide the different elements in the graph in visibly distinct colors.

As noted earlier, it is expected that the capacity tool programming may implement one or more filtering operations. To assist in understanding the filtering, FIGS. 7 to 9 also show a number of the data points that are filtered-out. For example, FIG. 7 shows a number of white, circular data points 731 that are removed before regression computation because the points correspond to usage levels and/or power levels that fall below respective threshold values. As another example, FIG. 8 shows a number of light-gray, circular data points 733 that are removed before regression computation because the points are at power levels above a power-overload threshold value.

FIG. 9 provides a graphic illustration of another example of filtering that may be employed. In this embodiment, usage versus power data points 735 (dark-gray circular points) are removed because they have residual differences from the regression line greater than a threshold value. Stated another way, the points 735 are too far off an initial calculation of the regression line to be considered as reliable. After removal of such data points 735, the processing involves a new linear regression performed on the remaining data points (dark circular points). This subsequent processing generates the new regression line of usage versus power, as shown in FIG. 9.

FIGS. 8 and 9 are also useful in showing a particular analysis feature offered by the linear regression approach. As shown in FIG. 8, analysis of the 6.1.1 cell-sector-carrier shows a steep (high) slope of 120.44. Both displayed capacity values (at the ■ and the \ on the graph) are fairly high. As such, the graph in FIG. 8 indicates that the performance of the transceiver associated with cell-sector-carrier 6.1.1 is relatively good. By contrast, as shown in FIG. 9, analysis of the 8.1.1 cell-sector-carrier shows a shallow (low) slope of 40.44. Both displayed capacity values (at the ■ and the \ on the graph) are fairly low. As such, the graph in FIG. 9 indicates that the performance of the transceiver associated with cell-sector-carrier 8.1.1 is poor, at least when compared to that of the 6.1.1 carrier shown in FIG. 8.

The design and operations personnel for the network carrier can use the slope information as a tool to identify under performing resources. Then, if adjustments are made in an effort to improve performance, the tool will provide a measure of any improvement. For example, if the 'before' graph for the 8.1.1 cell-sector-carrier looks like that of FIG. 9, hopefully, the graph for that cell-sector-carrier 'after' any engineering changes are implemented will show an improved graph more like that for the other carrier shown in FIG. 8. If the operating entity stores the before and after data, the engineer can actually compare the two and see (and/or compute) the degree of improvement in slope and projected capacities.

Those skilled in the art will recognize that the techniques outlined above have a broad range of applications, and the embodiments admit of a wide range of modifications, without departure from the inventive concepts. For example, actual embodiments may output the results in any of a wide range of different graphical and/or tabular formats. As another example, the displays illustrated are those which might be generated using a program drafted in Visual Basic for a Windows® environment. Clearly, the program used to implement the capacity analysis tool may be written in any convenient program language and/or for any desired operating system environment.

The location of the processing and the manner of access to the data and the results may vary depending on the specific hardware and software used. For example, in a client-server model, the server may perform the bulk of the processing and make the data (such as that shown in FIGS. 6–9) available as web-pages for output via a standard browser program running on the user's PC or other terminal device. Another option is to have the data storage and the processing/display generation functions all performed in the user's PC or workstation.

Several of the examples discussed above related to implementation in a CDMA network conforming to the IS-95 standard, however, the methodology is applicable to other networks and protocols, as well. For example, the implementations for IS-95 CDMA utilized measurements of Walsh code usage. The proposed methodology is applicable to W-CDMA (3GPP), which does not use Walsh codes specifically (a Walsh code is a specific self-generating function of mutually orthogonal codes . . . there are others). The utility of the usage and power analyses above applies to all forms of code usage for all forms of CDMA. It is believed that the methodology also is applicable to still further protocols and other types of wireless communication networks, for example, based on usage of other types of wireless network resources.

While the foregoing has described what are considered to be the best mode and/or other preferred embodiments, it is understood that various modifications may be made therein and that the invention or inventions disclosed herein may be implemented in various forms and embodiments, and that they may be applied in numerous applications, only some of which have been described herein. It is intended by the following claims to claim any and all modifications and variations that fall within the true scope of the inventive concepts.

What is claimed is:

1. A method of determining capacity of a resource in a wireless communication network having a base station serving one or more wireless remote stations, comprising:

recording level of usage of an air-link resource of the base station by wireless remote stations, during each of a plurality of intervals;

recording a base station power level of communications signals associated with the air-link resource of the base station, during each of the plurality of intervals;

performing a linear regression on data points of the recorded levels of usage and the recorded power levels, to calculate a regression line of usage versus power for the air-link resource;

identifying a power limit parameter associated with the air-link resource; and projecting a maximum usage capacity from a usage level on the regression line corresponding to a power level equal to the power limit parameter associated with the air-link resource.

2. A method as in claim 1, further comprising estimating a representative current usage value from a predetermined percentile of the recorded levels of usage.

3. A method as in claim 1, further comprising determining the slope of the regression line.

4. A method as in claim 1, further comprising calculating a correlation coefficient of the recorded levels of usage and the recorded power levels, to provide a confidence factor related to the accuracy of the regression line.

5. A method as in claim 1, further comprising filtering out usage versus power data points from the recorded data before performing the linear regression, for data points exhibiting an out-of-range characteristic.

6. A method as in claim 5, wherein the out-of-range characteristic comprises usage during an interval that is below a threshold value.

7. A method as in claim 5, wherein the out-of-range characteristic comprises power during an interval that is below a threshold value.

8. A method as in claim 5, wherein the out-of-range characteristic comprises power during an interval that is above a limit value.

9. A method as in claim 1, further comprising:
filtering from the recorded data usage versus power data points having a residual difference from the regression line greater than a threshold value; and
performing another linear regression on recorded levels of usage and recorded power levels remaining after the filtering, to calculate a new regression line of usage versus power.

10. A method as in claim 1, wherein:
the recorded base station power level of communications signals associated with the air-link resource of the base station comprises a power level of signals transmitted on a carrier from one of a plurality of sectors of the base station during each interval; and
the recorded level of usage of the air-link resource comprises usage of code resources during each interval, for communications carried on the carrier of the one sector during each interval.

11. A method as in claim 10, wherein:
the power level comprises peak power of transmissions of the carrier of the one sector during each interval; and
the usage of code resources is recorded in Erlangs, Centi-Call Seconds (CCS), or minutes of use (MOU) during each interval.

12. A method as in claim 10, wherein the power level comprises average power of transmissions of the carrier of the one sector during each interval.

13. A method as in claim 1, wherein:
the recorded base station power level of communications signals associated with the air-link resource of the base station comprises a power level of signals received on a carrier at the base station, for one of a plurality of carriers, during each interval; and
the recorded level of usage of the air-link resource comprises usage of code resources during each interval, for uplink communications on the carrier.

14. A method as in claim 1, wherein the identified power limit parameter associated with the resource corresponds to the point at which the regression line would cross an axis for power on a graph of usage versus power.

15. A method as in claim 1, wherein the step of identifying the power limit parameter associated with the resource comprises selecting a minimum from among the following:
overload power limit,
hardware power limit, and
pilot power plus an offset constant related to an acceptable level of interference.

16. A method of assessing usage of and operations relating to a resource in a wireless communication network having a base station serving one or more wireless remote stations, comprising:
recording level of usage of an air-link resource of the base station by wireless remote stations, during each of a plurality of intervals;
recording a base station power level of communications signals associated with the air-link resource of the base station, during each of the plurality of intervals;
performing a linear regression on data points of the recorded levels of usage and the recorded power levels, to calculate a regression line of usage versus power for the air-link resource;
deriving at least one metric regarding operations relating to the air-link resource from the regression line; and
estimating a representative current usage value, from the recorded levels of usage.

17. A method as in claim 16, wherein the deriving step comprises determining the slope of the regression line.

18. A method as in claim 16, further comprising calculating a correlation coefficient of the recorded levels of usage and the recorded power levels, to provide a confidence factor related to the accuracy of the regression line.

19. A method as in claim 16, further comprising filtering out usage versus power data points from the recorded data before performing the linear regression, for data points exhibiting an out-of-range characteristic.

20. A method as in claim 19, wherein the out-of-range characteristic comprises usage during an interval that is below a threshold value.

21. A method as in claim 19, wherein the out-of-range characteristic comprises power during an interval that is below a threshold value.

22. A method as in claim 19, wherein the out-of-range characteristic comprises power during an interval that is above a limit value.

23. A method as in claim 16, further comprising:
filtering from the recorded data usage versus power data points having a residual difference from the regression line greater than a threshold value; and
performing another linear regression on recorded levels of usage and recorded power levels remaining after the filtering, to calculate a new regression line of usage versus power.

24. A method as in claim 16, wherein:
the recorded base station power level of communications signals associated with the air-link resource of the base station comprises a power level of signals transmitted on a carrier from one of a plurality of sectors of the base station during each interval; and
the recorded level of usage of the air-link resource comprises usage of code resources during each interval, for communications carried on the carrier of the one sector during each interval.

25. A method as in claim 24, wherein:
the power level comprises peak power of transmissions of the carrier of the one sector during each interval; and
the usage of code resources is recorded in Erlangs, Centi-Call Seconds (CCS), or minutes of use (MOU) during each interval.

26. A method as in claim 24, wherein the power level comprises average power of transmissions of the carrier of the one sector during each interval.

27. A method as in claim 16, wherein:
the recorded base station power level of communications signals associated with the air-link resource of the base station comprises a power level of signals received on a carrier at the base station, for one of a plurality of carriers, during each interval; and
the recorded level of usage of the air-link resource comprises usage of code resources during each interval, for uplink communications on the carrier.

28. A method as in claim 16, wherein:
the deriving step comprises projecting a usage capacity from a predetermined point on the regression line; and
the method further comprises analyzing a potential for future growth in usage based on the estimated current usage value and the projected usage capacity.

29. A method as in claim 28, wherein:
the estimating step comprises estimating the representative current usage value from a usage level corresponding to a predetermined percentile of the recorded levels of usage; and
the projecting step comprises projecting a maximum usage capacity from a usage level on the regression line corresponding to a power limit parameter associated with the air-link resource.

30. A method of analyzing capacity and usage of air-link resources in a wireless communication network having a plurality of cell-site base stations serving wireless remote stations, comprising:
during each of a plurality of intervals, recording level of usage of a resource associated with a carrier of each of a plurality of sectors for each of a plurality of the base stations;
for each respective one of the carriers, recording a power level of communications signals associated with the respective carrier, during each of the plurality of intervals;
for each respective one of the carriers, performing a linear regression on the recorded levels of usage of the resource associated with the respective carrier and the recorded power levels of communications signals associated with the respective carrier, to calculate a regression line of usage versus power for the respective carrier;
identifying a power limit parameter for each respective one of the carriers;
for each respective one of the carriers, projecting a maximum usage capacity for the respective carrier from a usage level on the regression line for the respective carrier corresponding to a power level equal to the power limit parameter for each respective carrier; and
estimating a representative current usage value for each respective carrier as a usage level corresponding to a predetermined percentile of the recorded levels of usage for the respective carrier.

31. A computer system for determining capacity of a resource in a wireless communication network having a base station serving one or more wireless remote stations, the computer system comprising:
at least one programmable processor; and
a program for execution by the at least one processor, wherein execution of the program causes the computer system to perform the sequence of steps, comprising:
receiving level of usage of an air-link resource of the base station by wireless remote stations, during each of a plurality of intervals;
receiving data regarding a base station power level of communications signals associated with the air-link resource of the base station, during each of the plurality of intervals;
performing a linear regression on the levels of usage and the data regarding power levels, to calculate a regression line of usage versus power for the resource;
identifying a power limit parameter associated with the air-link resource; and
projecting a maximum usage capacity from a usage level on the regression line corresponding to a power level equal to the power limit parameter.

32. A computer system as in claim 31, wherein execution of the program causes the computer system to perform a step comprising estimating current usage from as a predetermined percentile of the recorded levels of usage.

33. A computer system for assessing operations and usage of a resource in a wireless communication network having a base station serving one or more wireless remote stations, the computer system comprising:
at least one programmable processor; and
a program for execution by the at least one processor, wherein execution of the program causes the computer system to perform the sequence of steps, comprising:
receiving level of usage of an air-link resource of the base station by wireless remote stations, during each of a plurality of intervals;
receiving data regarding a base station power level of communications signals associated with the air-link resource of the base station, during each of the plurality of intervals;
performing a linear regression on the levels of usage and the data regarding power levels, to calculate a regression line of usage versus power for the resource;
deriving at least one metric regarding operations associated with the air-link resource from the regression line; and
estimating a representative current usage value for the air-link resource from the received levels of usage.

34. A program product, comprising executable code transportable by at least one machine readable medium, wherein execution of the code by at least one programmable computer causes the at least one programmable computer to perform the sequence of steps, comprising:
receiving level of usage of an air-link resource of a base station of a wireless communication network by wireless remote stations, during each of a plurality of intervals;
receiving data regarding a base station power level of communications signals associated with the air-link resource of the base station, during each of the plurality of intervals;
performing a linear regression on the levels of usage and the data regarding power levels, to calculate a regression line of usage versus power for the resource;
identifying a power limit parameter associated with the air-link resource; and
projecting a maximum usage capacity, from a usage level of a point on the regression line corresponding to a power level equal to the power limit parameter.

35. A product as in claim 34, wherein execution of the program causes the at least one programmable computer to perform a step comprising estimating a value for current usage from the recorded levels of usage.

36. A program product, comprising executable code transportable by at least one machine readable medium, wherein execution of the code by at least one programmable computer causes the at least one programmable computer to perform the sequence of steps, comprising:
receiving level of usage of an air-link resource of a base station of a wireless communication network by wireless remote stations, during each of a plurality of intervals;

receiving data regarding a base station power level of communications signals associated with the air-link resource of the base station, during each of the plurality of intervals;

performing a linear regression on the levels of usage and the data regarding power levels, to calculate a regression line of usage versus power for the resource;

deriving at least one metric regarding operations associated with the air-link resource in the wireless network from the regression line; and estimating a representative current usage value for the air-link resource from the received levels of usage.

37. A method of analyzing operations regarding a resource in a wireless communication network having a base station serving one or more wireless remote stations, comprising:

recording level of usage of an air-link resource of the base station by wireless remote stations, during each of a plurality of intervals;

recording a base station power level of communications signals associated with the air-link resource of the base station, during each of the plurality of intervals;

performing a linear regression on the recorded levels of usage and the recorded power levels, to calculate a regression line of usage versus power for the air-link resource; and deriving at least one metric regarding operations associated with the air-link resource in the wireless network from the regression line.

38. A method as in claim 37, wherein the at least one metric relates to a projection of capacity for communications through the wireless network using the air-link resource.

39. A method as in claim 38, wherein the step of deriving comprises:

identifying a power limit parameter associated with usage of the air-link resource; and projecting the capacity from usage at a point on the regression line corresponding in power to the identified power limit parameter.

40. A method as in claim 37, further comprising estimating current usage of the air-link resource.

41. A method as in claim 40, wherein the step of estimating current usage comprises selecting a usage level corresponding to a predetermined percentile of usage, during the intervals.

42. A method as in claim 37, wherein the at least one metric relates to network performance during processing of communications through the wireless network using the air-link resource.

43. A method as in claim 42, wherein the step of deriving comprises determining the slope of the regression line.

44. A computer system for analyzing operations utilizing a resource in a wireless communication network having a base station serving one or more wireless remote stations, the computer system comprising:

a communication interface for receiving operations data from one or more elements of the wireless communication network at least one memory for storing received data; and at least one programmable processor for processing the stored data; and a program for execution by the at least one processor, wherein execution of the program causes the computer system to perform the sequence of steps, comprising:

receiving and storing level of usage of an air-link resource of the base station by wireless remote stations, during each of a plurality of intervals;

receiving and storing data regarding a base station power level of communications signals associated with the air-link resource of the base station, during each of the plurality of intervals;

performing a linear regression on the stored levels of usage and the stored data regarding power levels, to calculate a regression line of usage versus power for the air-link resource; and deriving at least one metric regarding operations associated with the air-link resource in the wireless network from the regression line.

45. A computer system as in claim 44, wherein the at least one metric is selected from the group consisting essentially of: projected capacity and performance.

46. A computer system as in claim 44, wherein:

the derivation of at least one metric comprises:

projecting usage capacity in relation to the air-link resource from a point on the regression line; and calculating a slope of the regression line as a metric of performance of network operations regarding the air-link resource; and the sequence of steps further comprises estimating current usage of the air-link resource from the stored data.

47. A program product, comprising executable code, wherein execution of the code by at least one programmable computer causes the at least one programmable computer to perform the sequence of steps, comprising:

receiving level of usage of an air-link resource of a base station by wireless remote stations, during each of a plurality of intervals;

receiving data regarding a base station power level of communications signals associated with the air-link resource of the base station, during each of the plurality of intervals;

performing a linear regression on the levels of usage and the data regarding power levels, to calculate a regression line of usage versus power for the resource; and deriving at least one metric regarding operations associated with the air-link resource in the wireless network from the regression line.

48. A product as in claim 47, wherein the at least one metric is selected from the group consisting essentially of: projected capacity and performance.

49. A product as in claim 47, wherein:

the derivation of at least one metric comprises:

projecting usage capacity in relation to the air-link resource from a point on the regression line; and calculating a slope of the regression line as a metric of performance of network operations regarding the air-link resource; and the sequence of steps further comprises estimating current usage of the air-link resource from the stored data.

50. A method of assessing performance in a wireless communication network having a base station serving one or more wireless remote stations, comprising:

recording level of usage of an air-link resource of the base station by wireless remote stations, during each of a plurality of intervals;

recording a base station power level of communications signals associated with the air-link resource of the base station, during each of the plurality of intervals;

performing a linear regression on the recorded levels of usage and the recorded power levels, to calculate a regression line of usage versus power for the air-link resource; and outputting slope of the regression line, as a metric representing performance with regard to wireless network operations utilizing the air-link resource.

51. A computer system for assessing performance in a wireless communication network having a base station serving one or more wireless remote stations, the computer system comprising:
- a communication interface for receiving operations data from one or more elements of the wireless communication network
- at least one memory for storing received data; and
- at least one programmable processor for processing the stored data; and
- a program for execution by the at least one processor, wherein execution of the program causes the computer system to perform the sequence of steps, comprising:
- receiving and storing level of usage of an air-link resource of the base station by wireless remote stations, during each of a plurality of intervals;
- receiving and storing data regarding a base station power level of communications signals associated with the air-link resource of the base station, during each of the plurality of intervals;
- performing a linear regression on the stored levels of usage and the stored data regarding power levels, to calculate a regression line of usage versus power for the air-link resource; and
- outputting slope of the regression line, as a metric representing performance with regard to wireless network operations utilizing the air-link resource.

52. A program product, comprising executable code, wherein execution of the code by at least one programmable computer causes the at least one programmable computer to perform the sequence of steps, comprising:
- receiving level of usage of an air-link resource of a base station by wireless remote stations, during each of a plurality of intervals;
- receiving data regarding a base station power level of communications signals associated with the air-link resource of the base station, during each of the plurality of intervals;
- performing a linear regression on the level of usage and the data regarding power levels, to calculate a regression line of usage versus power for the resource; and
- outputting slope of the regression line, as a metric representing performance with regard to wireless network operations utilizing the air-link resource.

* * * * *